US009076246B2

(12) United States Patent
Ma et al.

(10) Patent No.: US 9,076,246 B2
(45) Date of Patent: Jul. 7, 2015

(54) SYSTEM AND METHOD OF OVERLAYING IMAGES OF DIFFERENT MODALITIES

(75) Inventors: Kayan Ma, Toronto (CA); Sean Gill, Toronto (CA)

(73) Assignee: HOLOGIC, INC., Marlborough, MA (US)

( * ) Notice: Subject to any disclaimer, the term of this patent is extended or adjusted under 35 U.S.C. 154(b) by 252 days.

(21) Appl. No.: 13/570,550

(22) Filed: Aug. 9, 2012

(65) Prior Publication Data

US 2014/0044325 A1 Feb. 13, 2014

(51) Int. Cl.
*G06K 9/32* (2006.01)
*G06T 19/00* (2011.01)
*G06T 7/00* (2006.01)

(52) U.S. Cl.
CPC ............... *G06T 19/00* (2013.01); *G06T 7/0028* (2013.01); *G06T 2207/10028* (2013.01); *G06T 2207/10132* (2013.01); *G06T 2207/30004* (2013.01); *G06T 2210/41* (2013.01)

(58) Field of Classification Search
CPC ....................................................... G06K 9/32
USPC ........................................................ 382/128
See application file for complete search history.

(56) References Cited

U.S. PATENT DOCUMENTS 4,825,162 A 4/1989 Roemer et al.
5,297,551 A 3/1994 Margosian et al.
5,594,337 A 1/1997 Boskamp
5,682,890 A 11/1997 Kormos et al.
5,806,521 A * 9/1998 Morimoto et al. ............ 600/447
6,159,221 A 12/2000 Chakeres
6,281,681 B1 8/2001 Cline et al.
6,324,243 B1 11/2001 Edic et al.
6,421,454 B1 7/2002 Burke et al.
6,421,553 B1 7/2002 Costa et al.
6,628,983 B1 9/2003 Gagnon
6,950,492 B2 9/2005 Besson
7,020,314 B1 3/2006 Suri et al.
7,024,027 B1 4/2006 Suri et al.

(Continued)

FOREIGN PATENT DOCUMENTS

CN 1640139 A 7/2005
CN 101601266 A 12/2009

(Continued)

OTHER PUBLICATIONS

A Comparison between Magnetic Resonance Imaging and Computed Tomography for Stereotactic Coordinate Deteremination. 1992. Kondziolka, Dempsey, Lunsford, Kestle, Dolan, Kanal and Tasker.*

(Continued)

*Primary Examiner* — Stephen R Koziol
*Assistant Examiner* — Delomia Gilliard
(74) *Attorney, Agent, or Firm* — Vista IP Law Group LLP

(57) ABSTRACT

Systems and methods of overlaying a three-dimensional image of a tissue and an image of the tissue from an imaging transducer, having a field of view are disclosed. The method includes determining pixel dimensions of the field of view in the second co-ordinate space, scaling the three-dimensional image in the first co-ordinate space to match the pixel dimensions of the field of view in the second co-ordinate space, and displaying an overlaid image comprising the three-dimensional image and the field of view of the imaging transducer.

29 Claims, 13 Drawing Sheets

510
(x₀, y₀)
$ROC_x$
$ROC_y$
506
508
Midpt
504
y(i)
x(i)
502
500

(56) References Cited

U.S. PATENT DOCUMENTS

| | | | | |
|---|---|---|---|---|
| 7,155,043 | B2 | 12/2006 | Daw | |
| 7,176,683 | B2 | 2/2007 | Reeder et al. | |
| 7,245,125 | B2 | 7/2007 | Harer et al. | |
| 7,245,694 | B2 | 7/2007 | Jing et al. | |
| 7,545,966 | B2 | 6/2009 | Lewin et al. | |
| 7,583,786 | B2 | 9/2009 | Jing et al. | |
| 7,809,426 | B2 | 10/2010 | Kim et al. | |
| 7,881,428 | B2 | 2/2011 | Jing et al. | |
| 8,155,417 | B2 | 4/2012 | Piron et al. | |
| 2002/0065461 | A1* | 5/2002 | Cosman | 600/426 |
| 2002/0131551 | A1 | 9/2002 | Johnson et al. | |
| 2003/0194048 | A1* | 10/2003 | De Man et al. | 378/4 |
| 2003/0194050 | A1 | 10/2003 | Eberhard et al. | |
| 2004/0004614 | A1* | 1/2004 | Bacus et al. | 345/419 |
| 2005/0096539 | A1* | 5/2005 | Leibig et al. | 600/437 |
| 2006/0182320 | A1* | 8/2006 | Peszynski et al. | 382/128 |
| 2006/0221942 | A1 | 10/2006 | Fruth et al. | |
| 2007/0262983 | A1* | 11/2007 | Choi | 345/420 |
| 2009/0054764 | A1* | 2/2009 | Adler et al. | 600/425 |
| 2010/0004539 | A1* | 1/2010 | Chen et al. | 600/445 |
| 2010/0041996 | A1* | 2/2010 | Nygaard et al. | 600/459 |
| 2010/0265163 | A1* | 10/2010 | Legerton et al. | 345/7 |
| 2011/0134113 | A1* | 6/2011 | Ma et al. | 345/419 |
| 2011/0234582 | A1* | 9/2011 | Daiku et al. | 345/419 |
| 2012/0093385 | A1* | 4/2012 | Yokosawa et al. | 382/131 |
| 2012/0123563 | A1* | 5/2012 | Drinkard | 700/13 |
| 2012/0195484 | A1* | 8/2012 | Ren et al. | 382/131 |
| 2013/0028469 | A1* | 1/2013 | Lee et al. | 382/103 |

FOREIGN PATENT DOCUMENTS

| | | | |
|---|---|---|---|
| EP | 2503934 | A1 | 10/2012 |
| WO | 2006017172 | A1 | 2/2006 |
| WO | 2011134113 | A1 | 11/2011 |

OTHER PUBLICATIONS

General Electric—Press Release—"GE Healthcare Introduces Ultrasound Fusion; New LOGIQ E9 Merges Real-time Ultrasound with CT, MR and PET," Sep. 2, 2008, 2 pages.

International Preliminary Report of Patentability for International Application No. PCT/CA2010/001871 dated May 30, 2012, 1 page.

International Search Report and Written Opinion of the International Searching Authority for International Application No. PCT/CA2010/001871 dated Mar. 8, 2011, 9 pages.

M. Berger, "Image Fusion and Needle Guidance in Ultrasound", General Electric, Power Point Presentation, date unknown, 17 pages, Sep. 2008.

P. Mullen and C. Owen, "MR, Ultrasound Fusion: Bridging the Gap Between Clinical Benefits, Access and Equipment Utilization," SignaPULSE—A GE Healthcare MR Publication, Spring 2009, 5 pages, Apr. 2009.

Piron, Cameron A., Hybrid Imaging Guidance System for Biopsy of the Breast, Thesis Paper, University of Toronto, 2001. cited by other, Jan. 2001.

* cited by examiner

SYSTEM AND METHOD OF OVERLAYING IMAGES OF DIFFERENT MODALITIES

BACKGROUND

Medical imaging devices provide non-invasive methods to visualize the internal structure of a patient. Such non-invasive visualization methods can be helpful in treating patients for various ailments. For example, the early detection of cancer in a patient can be important in treating that patient. For most cancers, when detected at an early stage, the survival probability of the patient can increase.

There are many medical imaging methods available for visualizing the internal structure of a patient, each with its own benefits and its own limitations. For example, non-invasive medical imaging techniques may include MRI systems, three-dimensional (3D) X-ray computed tomography (CT) imagers, 3D optical coherence tomography imagers, or other 3D medical image of a tissue of a patient such as single proton emission computed tomography, and position emission tomography.

Magnetic resonance imaging (MRI) uses magnetic fields to image tissue of a patient placed inside a powerful uniform magnetic field of an MRI scanner. The MRI scanner can align the magnetic moments of protons in the tissue (typically hydrogen protons of water molecules in the tissue) in the direction of the field, processing about the field at their Larmor frequency. An excitation magnetic field (typically orthogonal to the main magnetic field) near the Larmor frequency is applied to alter the alignment of the protons in the tissue, typically flipping the magnetic moment of the protons in the main field. When the excitation field is turned off, the protons emit a photon that can be detected and processed to form an MRI image of the tissue. Each image is a slice of the tissue of the patient, and numerous images or slices are created that clearly show all the features of the tissue of the patient. The slices can be reconstructed into a single three-dimensional image, allowing complete visualization of the tissue of the patient scanned from all angles.

Other 3D imaging systems include tomosynthesis systems, which are X-ray based systems, and have recently been developed for use in breast cancer screening. In contrast to typical mammography systems, the tomosynthesis system acquires a series of x-ray projection images, each projection image obtained at a different angular displacement as the x-ray source traverses along a path over the breast. Reconstructed tomosynthesis slices reduce or eliminate the problems caused by tissue overlap and structure noise in single slice two-dimensional (2D) mammography imaging. Digital breast tomosynthesis also offers the possibility of reduced breast compression, improved diagnostic and screening accuracy, fewer recalls, and 3D lesion localization.

Ultrasound imaging is another non-invasive medical imaging technique, which uses sound waves, typically produced by piezoelectric transducers (or transducers) to image a tissue in a patient. The ultrasound transducer focuses the sound waves, typically producing an arc-shaped sound wave which travels into the body and is partially reflected from the layers between different tissues in the patient. The reflected sound wave is detected by the transducer and converted into electrical signals that can be processed by the ultrasound scanner to form an ultrasound image of the tissue. The ultrasound images formed may be 2D images or 3D images. The 3D ultrasound images may be formed by producing sound waves at different viewing angles, multiplexing the reflected signals and processing the multiplexed signals to construct a three dimensional scan image of a body object. In contrast with MRI and tomosynthesis systems, ultrasound systems typically produce a real-time stream of consecutive images.

SUMMARY

It is appreciated that each of the imaging techniques described above, including tomosynthesis imaging, MRI imaging and ultrasound imaging techniques, have certain advantages and certain drawbacks. For example, ultrasound imaging tends to provide improved imaging of tendon structure in a patient over images of the same tendon structure provided by MRI imaging. Meanwhile, MRI imaging tends to provide superior soft-tissue contrast resolution as compared to ultrasound images. For example, typical MRI imaging tends to allow individual structures such as a lung, liver, kidney, bowel, and gray and white matter to be distinguished in the MRI images.

Another distinction includes the field of view (FOV) of the resulting image. Ultrasound imaging generally provides a smaller field-of-view as compared to MRI imaging, because the resolution of ultrasound images tends to be restricted by the sound wave penetration through soft tissues and bone. For example, ultrasound imaging has difficulty penetrating bone and thus typically only sees the outer surface of bone structure and not what lies within.

Meanwhile, an advantage of ultrasound imaging as compared to MRI imaging is that ultrasound imaging provides real-time feedback. For example, an ultrasound technician can position the ultrasound transducer directly on a patent in a first position and view the ultrasound image in real time. Subsequently, the technician can move the ultrasound transducer to a second, perhaps more desirable position, to view the new ultrasound image, again in real time. This ability to adjust the position of the transducer, while viewing the ultrasound image in real time, provides the technician the ability adjust the ultrasound image until they are satisfied with the displayed image. Real-time imaging can be helpful during interventional procedures. For example, during biopsy, ultrasound imaging can help guide the movements of the biopsy tool in real-time as the biopsy needle is inserted in the tissue.

It would be advantageous to combine the benefits of 3D medical imaging such as MRI imaging, single photon emission computed tomography, computed tomography, or positron emission tomography and ultrasound imaging, by overlaying images of a tissue produced using multiple imaging techniques. Overlaying 3D images and ultrasound images produces a superimposed image that shows the features of the 3D image and the features of the ultrasound image, and further takes advantage of the strengths of both imaging systems. In addition, according to various examples, because the overlaid 3D and ultrasound images are co-registered as further described below, real-time changes in the FOV or zooming in or out of the ultrasound image, results in corresponding real-time transformation of the superimposed image.

It is appreciated that current approaches are limited to using 3D and 2D images produced by an imaging manufacturer on a single platform having a common video feed of the images. Typically, the single platform is equipped with a software upgrade that provides the image overlaying functionality. The software upgrade may be costly and is typically not transferable to another machine to provide the same functionality. Instead, the systems and methods described herein for overlaying images are platform agnostic and do not require a common video feed. For example, systems and methods described herein are configured to receive images or video feed of different modalities supplied by independent imaging systems that may be made by different manufacturers. In various examples, the image processors described herein are configured to determine the dimensions and orientation of the received images without any prior knowledge of the image features. These systems and methods can allow a workstation, such as a navigation system, to reformat and display image data where that workstation is compatible with multiple commercially available imaging systems. Further, the systems and methods described herein either store information regarding multiple platforms and transducers or can be calibrated to be used with multiple platforms at the clinical site.

According to one embodiment, a method overlaying a three-dimensional image of a tissue and an image of the tissue from an imaging transducer, having a field of view is disclosed. In one example, the method comprises co-registering a first co-ordinate space of the three-dimensional image with a second co-ordinate space of the field of view of the image from the imaging transducer, determining pixel dimensions of the field of view in the second co-ordinate space, scaling the three-dimensional image in the first co-ordinate space to match the pixel dimensions of the field of view in the second co-ordinate space, transforming position and orientation of the three-dimensional image of the tissue in the first co-ordinate space to match position and orientation of the field of view in the second co-ordinate space, and displaying an overlaid image comprising the three-dimensional image and the field of view of the imaging transducer.

In another example, determining pixel dimensions of the field of view further comprises determining pixel coordinates of points of interest on an upper boundary of the field of view, and determining pixel width and height based on geometry of the upper boundary of the field of view. In this example, the imaging transducer comprises a linear transducer, the upper boundary comprises a line segment, and the points of interest comprise ends points and a midpoint of the line segment. In addition, determining the pixel width and height based on geometry further comprises determining the pixel width and height based on geometry of the line segment and aspect ratio of the image.

In one example, the imaging transducer comprises a curvilinear transducer, the upper boundary comprises an arc segment, and the points of interest comprise a midpoint and a radius of curvature. In this example, determining the pixel width and height based on geometry further comprises determining the pixel width and height based on geometry of the arc segment and aspect ratio of the image.

In another example, the method further comprises detecting changes in image depth of the field of view of the image and rescaling the field of view based on a scaling factor to match an adjusted image depth of the field of view. In addition, the method may further comprise receiving the three-dimensional image of the tissue from a first imaging system and receiving the image of the tissue from the imaging transducer from a second imaging system, wherein the first imaging system is different from the second imaging system.

According to another embodiment, an apparatus for overlaying a three-dimensional image of a tissue and an image of the tissue from an imaging transducer, having a field of view is disclosed. In one example, the apparatus comprises a non-transitory computer readable medium configured to store any of the three-dimensional image and the image from the imaging transducer, a processor, coupled to the computer readable medium and configured to co-register a first co-ordinate space of the three-dimensional image with a second co-ordinate space of the field of view of the image from the imaging probe; determine pixel dimensions of the field of view in the second co-ordinate space, scale the three-dimensional image in the first co-ordinate space to match the pixel dimensions of the field of view in the second co-ordinate space, and transform position and orientation of the three-dimensional image in the first co-ordinate space to match the position and orientation of the field of view in the second co-ordinate space, and a display configured to display an overlaid image comprising the three-dimensional image overlaid and the field of view of the imaging transducer.

In one example, the processor is configured to determine pixel coordinates of points of interest on an upper boundary of the field of view and determine pixel width and height based on geometry of the of the upper boundary of the field of view. In another example, the imaging transducer comprises a linear transducer, the upper boundary comprises a line segment, and the points of interest comprise ends points and a midpoint of the line segment. In one example, the imaging transducer comprises a curvilinear transducer, the upper boundary comprises an arc segment, and the points of interest comprise a midpoint and a radius of curvature.

In one example, the processor is further configured to detect changes in image depth of the field of view of the image and rescale the field of view based on a scaling factor to match an adjusted image depth of the field of view. In addition, the apparatus may further comprise an input module configured to receive the three-dimensional image of the tissue from a first imaging system and configured to receive the image of the tissue from the imaging transducer from a second imaging system, wherein the first imaging system is different from the second imaging system.

According to another aspect, a method overlaying an image of a tissue from an imaging system, having an imaging transducer with a field of view, and a three-dimensional image of the tissue is disclosed. In one example, the method comprises co-registering a first co-ordinate space of the three-dimensional image with a second co-ordinate space of the field of view of the image from the imaging transducer, receiving input bounds of the field of view and depth markers identified in the image, determining pixel spacing based on depth associated with the depth markers in the image, and scaling the three-dimensional image in the first co-ordinate space to match the pixel spacing of the field of view in the second co-ordinate space, transforming position and orientation of the three-dimensional image of the tissue in the first co-ordinate space to match the position and orientation of the field of view in the second co-ordinate space, and displaying an overlaid image comprising the field of view of the imaging transducer and the three-dimensional image.

In one example, the method further comprises receiving depth associated with each of the depth markers in the field of view. In addition, the method may further comprise receiving input identifying a freeze state of the image from the transducer.

In another example, the method comprises determining co-ordinates of points of interest defining center, upper and lower bounds of the field of view and determining pixel spacing based on the co-ordinates of the point of interest. In one example, the method further comprises determining whether the field of view of the image is cropped.

In another example, the imaging transducer comprises a curvilinear transducer, and the method further comprises detecting an angle of the field of view of the curvilinear transducer. In addition, the method may further comprise determining a set of pixels configured to define the field of view and masking out another set of pixels outside the defined the set of pixels defining the field of view.

In another example, the method further comprises receiving the three-dimensional image of the tissue from a first imaging system, and receiving the image of the tissue from the imaging transducer from a second imaging system, wherein the first imaging system is different from the second imaging system.

According to another embodiment, an apparatus for overlaying an image of a tissue from an imaging system, having an imaging transducer with a field of view, and a three-dimensional image of the tissue is disclosed. In one example the apparatus comprises a non-transitory computer readable medium configured to store any of the three-dimensional image and the image from the imaging transducer, a processor coupled to the computer readable medium and configured to co-register a first co-ordinate space of the three-dimensional image with a second co-ordinate space of the field of view of the image from the imaging transducer, receive input identifying bounds of the field of view and depth markers in the image, determine pixel spacing based on depth associated with the depth markers in the image and scale the three-dimensional image in the first co-ordinate space to match the pixel spacing of the field of view in the second co-ordinate space and transform position and orientation of the three-dimensional image in the first co-ordinate space to match the position and orientation of the field of view in the second co-ordinate space and a display configured to display an overlaid image comprising the field of view of the imaging transducer and the three-dimensional image.

In addition, the apparatus may further comprise an input module configured to receive the three-dimensional image of the tissue from a first imaging system and configured to receive the image of the tissue from the imaging transducer from a second imaging system, wherein the first imaging system is different from the second imaging system.

According to another embodiment, a method of calibrating an imaging system for overlaying an image of a tissue from the imaging system and a three-dimensional image of the tissue, the imaging system having an imaging transducer with a field of view, is disclosed. In one example, the method comprises providing for a user to select bounds of the field of view of the imaging transducer, providing for the user to select depth marker indicators in the image, cycling through the depth marker indicators to determine a specific depth marker for each depth, and calculating coordinates of points of interest in the field of view of the image and calculating pixel spacing based on the coordinates of the points of interest and depth associated with the depth markers in the image.

In another example, the method may further comprise providing for the user to select an area identifying a freeze state of the image from the transducer. In addition, the method may further comprise providing for the user to select a background threshold, wherein the background threshold is used to filter an ultrasound signal overlapping with the depth marker indicators. In one example, the method further comprises determining whether the field of view of the image is cropped. Further, the imaging transducer comprises a curvilinear transducer, and the method further comprises detecting an angle of the field of view of the curvilinear transducer.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

According to various embodiments, systems and methods of overlaying a first image produced by a first modality and a second image produced by a second modality are described below. In one example, the first image produced by a first modality includes a 3D image, such as an MRI image acquired using an MRI imaging system, and the second image produced by a second modality includes a 2D image, such as an ultrasound image acquired using an ultrasound imaging system. It is appreciated that while some systems and methods described below describe overlaying an MRI image and an ultrasound image, it is appreciated that other imaging modalities can be used to overlay any imaging modality with that of another, for example, single photon emission computed tomography, computed tomography, positron emission tomography or 3D ultrasound imaging.

As an illustrative example, one method of overlaying a 3D image and an ultrasound image uses geometry of the ultrasound signal and ultrasound transducers to determine pixel dimensions in the ultrasound image. This method uses the pixel dimensions to scale the 3D image to match the dimensions of the ultrasound image. Another method describes an alternative method of overlaying the 3D image and the ultrasound image that uses symbol matching to identify depth markers and links the depth markers to a given depth and ultrasound settings. This method uses the depth and the ultrasound settings to determine pixel spacing of the ultrasound image, which is then used to scale the ultrasound image to match the scaling of the 3D image. It is appreciated that images produced by either modality may be considered as a base image or an overlaid image and either the base or the overlaid image may be scaled to match the other image.

Figure 1:
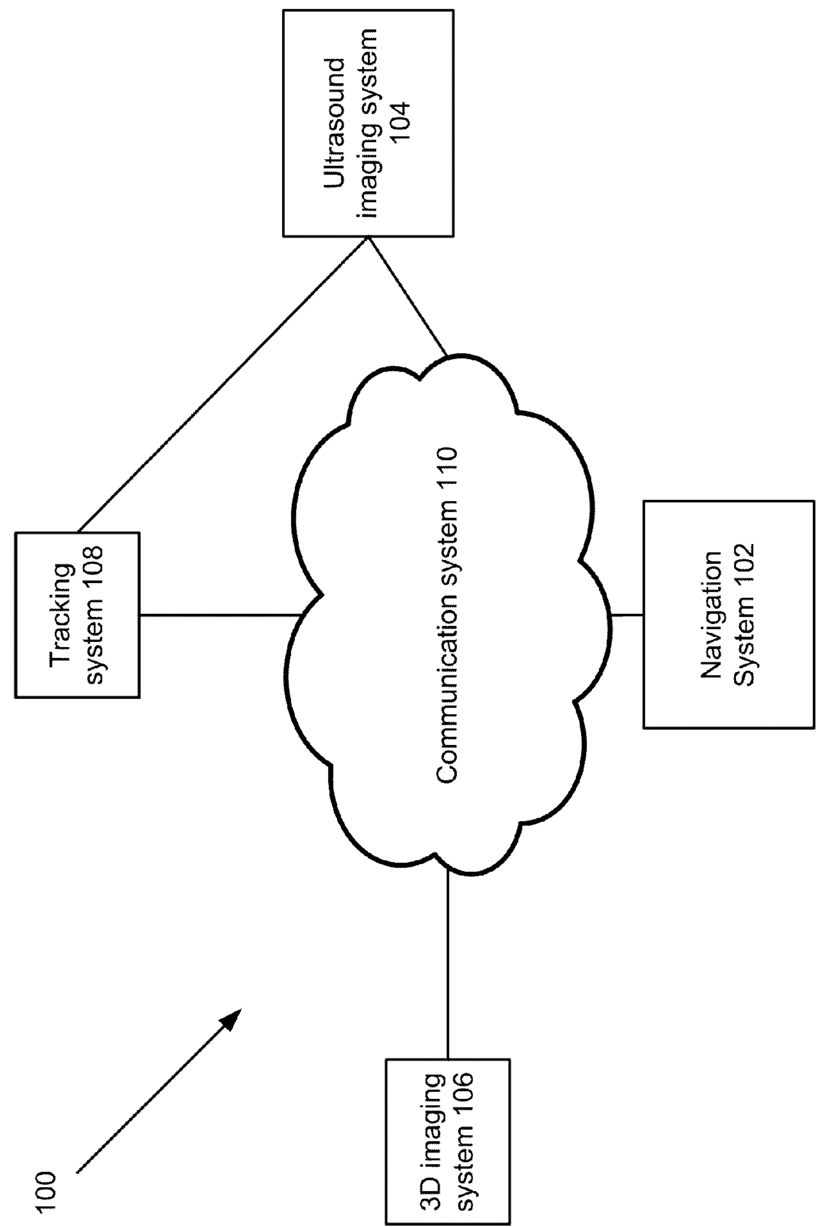
FIG. 1 is a schematic diagram of a system used to implement methods of overlaying 3D images and the ultrasound images, according to various embodiments.

FIG. 1 is a diagram of an embodiment of a system 100 used to implement the methods of overlaying 3D images and the ultrasound images described herein, according to various embodiments of the invention. The system 100 includes a 3D imaging system 106, a tracking system 108, an ultrasound imaging system 104, a communication system 110 and a navigation system 102. The 3D imaging system 106 and the tracking system 108 are each connected to the navigation system 102 via the communication system 110 and the ultrasound image system 104 is connected to the tracking system 108.

In summary according to various embodiments, the 3D imaging system 106 obtains and stores one or more 2D image slices of a tissue of a patient. The stored 2D images can be compiled into the 3D image of the tissue, which can be displayed by the 3D imaging system 106. The 3D imaging system 106 transmits the 3D image to the navigation system 102, which can reformat the 3D image for display on the navigation system 102, as further described below. The ultrasound imaging system 104 obtains an ultrasound image of a tissue of a patient using an ultrasound transducer and displays the image in real-time. The ultrasound imaging system 104 can be configured for use with navigation system 102 by a calibration process using the tracking system 108. Once the ultrasound imaging system 104 is calibrated as described below, the tracking system 108, using sensors, tracks the physical position, in which ultrasound imaging system 104 is imaging the tissue of the patient. Thus, through the calibration process, the position and orientation of the ultrasound image plane can be determined relative to the sensors via the tracking system.

The navigation system 102 can use the position and orientation of the ultrasound plane to determine the position and orientation of the ultrasound transducer relative to the tracked position of the sensors. The navigation system 102 can then be configured to co-register and overlay the ultrasound image and the 3D image using various embodiments described herein. According to various embodiments, the transducer may be a linear or a curvilinear transducer. However, other transducer shapes may be used as appreciated by one skilled in the art given the benefit of this disclosure.

In more detail, and referring again to FIG. 1, according various embodiments, the 3D imaging system 106 obtains a 3D image of the tissue of a patient and stores the image locally on 3D imaging system 106 or in some embodiments in a Picture Archiving Communications System (PACS). Typically, the image format of the 3D image is a DICOM format. However, skilled persons will understand that other image formats can be used. Once a tissue of a patient is imaged with the 3D imaging system 106, the stored image of the tissue can be reconstructed into a 3D image of the tissue and can be displayed by the 3D imaging system 106, or another workstation. The 3D image, when displayed by an image viewer, such as a DICOM viewer, can be reformatted and repositioned to view the tissue image at any plane and any slice position.

In one example, the 3D imaging system 106 transmits the 3D image to the navigation system 102 via the communication system 110, for example via a PACS network, where such 3D image can be stored and viewed. The navigation system 102 displays the 3D image obtained by the 3D imaging system. The 3D image can be reformatted for display on the navigation system 102. The 3D image can be reformatted and repositioned to view the image at any plane and any slice position or orientation. In some embodiments, the navigation system 102 displays multiple frames or windows on the same screen showing alternative views or orientations of a 3D image slice.

According to various embodiments, the ultrasound imaging system 104 obtains an ultrasound image of a tissue of a patient. The ultrasound image is typically obtained using an ultrasound transducer, which is used to image a portion of a tissue of a patient within a FOV of the ultrasound transducer. The ultrasound imaging system 104 displays the obtained ultrasound image of the patient's anatomy in real-time as the patient is being imaged. In some embodiments, the ultrasound image can additionally or alternatively be stored on a non-transitory storage medium, for reconstruction or playback at a later time.

In some embodiments, a real-time stream of consecutive two-dimensional images can be loaded into the navigation system 102 from an external feed from the ultrasound system 104. For example, these images can be streamed using S-Video, HDMI, or other video streaming techniques. In some embodiments, hardware used to receive such video streaming may be used to capture the streaming video. One example of video capture hardware includes a frame grabber card installed in the navigation system 102. However, it is appreciated that other methods of capturing ultrasound images can be used.

The tracking system 108 may track the position of tracking sensors connected to the ultrasound imaging system 104 and provide the navigation system 102 with data representing the co-ordinates of the transmitters in a tracker co-ordinate space. The sensors may comprise transmitter and may also function as receivers, for example when used in active optical tracking systems. In some embodiments, the tracking system 108 may be an optical tracking system comprising an optical camera and optical sensors. However, skilled persons will understand that any device or system capable of tracking the position of an object in space can be used, for example an RF tracking system comprising an RF receiver and RF transmitters.

The ultrasound imaging system 104 is configured for use with the navigation system 102 by a calibration process using the tracking system 108. In one embodiment, the calibration process is described in U.S. application publication no. 2011/0134113, the contents of which is incorporated herein by reference (hereinafter '113 application). The sensors that are removably connected to the ultrasound transducer of ultrasound imaging system 104 may transmit position data to tracking system 108 in the tracker co-ordinate space, which in turn provides this information to navigation system 102. For example, sensors may be positioned on the transducer of the ultrasound imaging system 104 so that the tracking system 108 can monitor the position and orientation of the ultrasound transducer and provide this information to navigation system 102 in the tracker co-ordinate space. The navigation system 102 can use this tracked position to determine the position and orientation of the ultrasound transducer relative to the tracked position of the transmitters.

In some embodiments, the configuration of the ultrasound imaging system 104 occurs using a configuration tool, where its position and orientation can be additionally tracked by the tracking system 108. One example of configuration of the ultrasound imaging system is described in the '113 application. In the described example of configuration, the configuration tool contacts the transducer face of the ultrasound transducer of ultrasound imaging system 104 and tracking system 108 transmits information representing the position and orientation of the configuration tool in the tracker co-ordinate space to the navigation system 102. The navigation system 102 can determine a configuration matrix that can be used to determine the position and orientation of the FOV of the ultrasound transducer in the tracker co-ordinate space, based on the tracked position of the transmitters connected to the ultrasound transducer.

In one example, a database having configuration data of a plurality of brands or models of various ultrasound transducers is used to pre-load FOV dimensions of the ultrasound transducers into navigation system 102 during configuration. In another example, the FOV dimensions of the ultrasound transducers are obtained from the clinical site during a calibration procedure as further described below. For example, the various ultrasound transducers may include linear and/or curvilinear transducers.

Once the ultrasound imaging system 104 is calibrated with the navigation system 102, the tissue of the patient can be imaged with the ultrasound imaging system 104. During ultrasound imaging, the tracking system 108 monitors the position and orientation of the ultrasound transducer of ultrasound imaging system 104 and provides this information in the tracker co-ordinate space to the navigation system 102. Because the ultrasound imaging system 104 has been configured for use with the navigation system 102, the navigation system 102 may determine the position and the orientation of the FOV of the ultrasound transducer of the ultrasound imaging system 104.

One example of configuration further includes the selection of a landmark within the 3D image, for example, using an interface permitting a user to select an anatomical target. In some embodiments, the landmark can be an internal tissue landmark, such as tendon, bone, veins or arteries, and in other embodiments, the landmark can be an external landmark, such as a fiducial skin marker, such as a navel or nipple. In this embodiment, the same landmark selected in the 3D image is located with the ultrasound transducer, and upon location, the coordinates of the representation of the target in the tracker co-ordinate space is captured.

In one example, the navigation system 102 uses the relative differences between the coordinates of the target in the 3D image and the co-ordinates of the target in the tracker co-ordinate space to determine the translational parameters required to align the two co-ordinate spaces. The plane orientation information acquired previously can be combined with the translation parameters to provide a complete 4×4 transformation matrix capable of co-registering the two co-ordinate spaces. In at least one example, multiple landmarks may be selected within the images, which can be used to capture multiple image planes. One example of co-registering the two co-ordinate space is described in the '113 application. Any method of co-registering the co-ordinate spaces may be used, such as for example, a touch point fiducial marker registration method.

The navigation system 102 can then use the transformation matrix to reformat the 3D image being displayed so that the slice of tissue being displayed is in the same plane and in the same orientation as the FOV of the ultrasound transducer of ultrasound imaging system 104. Using various methods described below, the slice of the 3D image being displayed by navigation system 102 and the ultrasound image displayed by ultrasound imaging system 104 can be combined by the navigation system 102. The combined image allows the user to view both the 3D image and the ultrasound image simultaneously, overlaid on the same display. In some embodiments, the navigation system 102 can enhance certain aspects of the superimposed ultrasound or the 3D images to increase the quality of the resulting combined image. In addition, the navigation system 102 can detect and correct for changes input by the user of the navigation system 102, including changes in FOV angle window, zoom and depth.

In the embodiments described above, the 3D imaging system 106, the tracking system 108 and the navigation system 102, together with the ultrasound imaging system 104, are communicatively connected, via the communication system 110, in a stand-alone system. The tracking system 108 is in communication with the navigation system 102 via the communication system 110 and tracks the physical position in which ultrasound imaging system 104 is imaging the tissue of the patient. In some embodiments, the tracking system 108 can be connected directly to the navigation system 102 via a direct communication system or a wireless communication system. In some embodiments, the ultrasound imaging system 104 can be communicatively connected via the communication system 110. In one example, the ultrasound imaging system 104 is connected to the navigation system via a direct communication system, such as, including but not limited to VGA, DVI, S-Video, or HDMI. The communication system 110 can also include a PACS network, a local area network, wide area network, wireless network, internet, intranet, or other similar communication system.

In one embodiment, the 3D image of a patient can be accessed remotely by the navigation system 102 via the communication system 110, and in other embodiments can be stored on a server in communication with the navigation system 102 via the communication system 110. In some embodiments, the navigation system 102 can access the ultrasound image, and in such embodiments the ultrasound imaging system 104 is further connected to the communication system 110 and a copy of the ultrasound image obtained by the ultrasound imaging system 104 can be transmitted to the navigation system 102 via the communication system 110. In other embodiments, the navigation system 102 can remotely access and copy the ultrasound image via communication system 110, and in alternative embodiments, a copy of the ultrasound image can be stored on a server in communication with the navigation system 102 via the communication system 110 and accessed remotely by navigation system 102.

The 3D image obtained by the 3D imaging system 106 can be transmitted to the navigation system 102 at any point in time, for example immediately after obtaining the 3D image, or on the request of the navigation system 102. In alternative embodiments, the 3D image is transmitted to the navigation system 102 by a transportable media device, such as a flash drive, CD-ROM, diskette, or other such transportable media device.

According to various embodiments, the methods of overlaying the 3D image, such as an MRI image and the acquired ultrasound image are described below. Method 200 describes a method of co-registering and overlaying the ultrasound image over the 3D image where the ultrasound transducer is a linear transducer. The method 400 describes a method of co-registering and overlaying the ultrasound image over the 3D image where the ultrasound transducer is a curvilinear transducer. Method 600 describes a method of dynamic depth detection used with methods 200 and 400 which can be used to automatically detect changes in image depth dynamically throughout an imaging session. Method 700 describes an alternative method of overlaying the 3D image and the ultrasound image that uses symbol matching to identify depth markers and links the depth markers to a given depth and ultrasound settings.

The methods described below relate to overlaying the 3D image and the ultrasound image may be easily applied to using any 3D modality to be used with the ultrasound system, such as CT imaging, 3D medical imaging such as single photon emission computed tomography, computed tomography, or positron emission tomography or 3D ultrasound imaging. However, it is appreciated that some modification to the method may be necessarily based on features and limitations of each of the above described modalities. For example, unlike the MRI modality, to overlay a 3D CT image and an ultrasound image, the navigation system may limit the number and types of CT images available for overlaying.

Overlaying Using a Linear Ultrasound Transducer.

Figure 2:
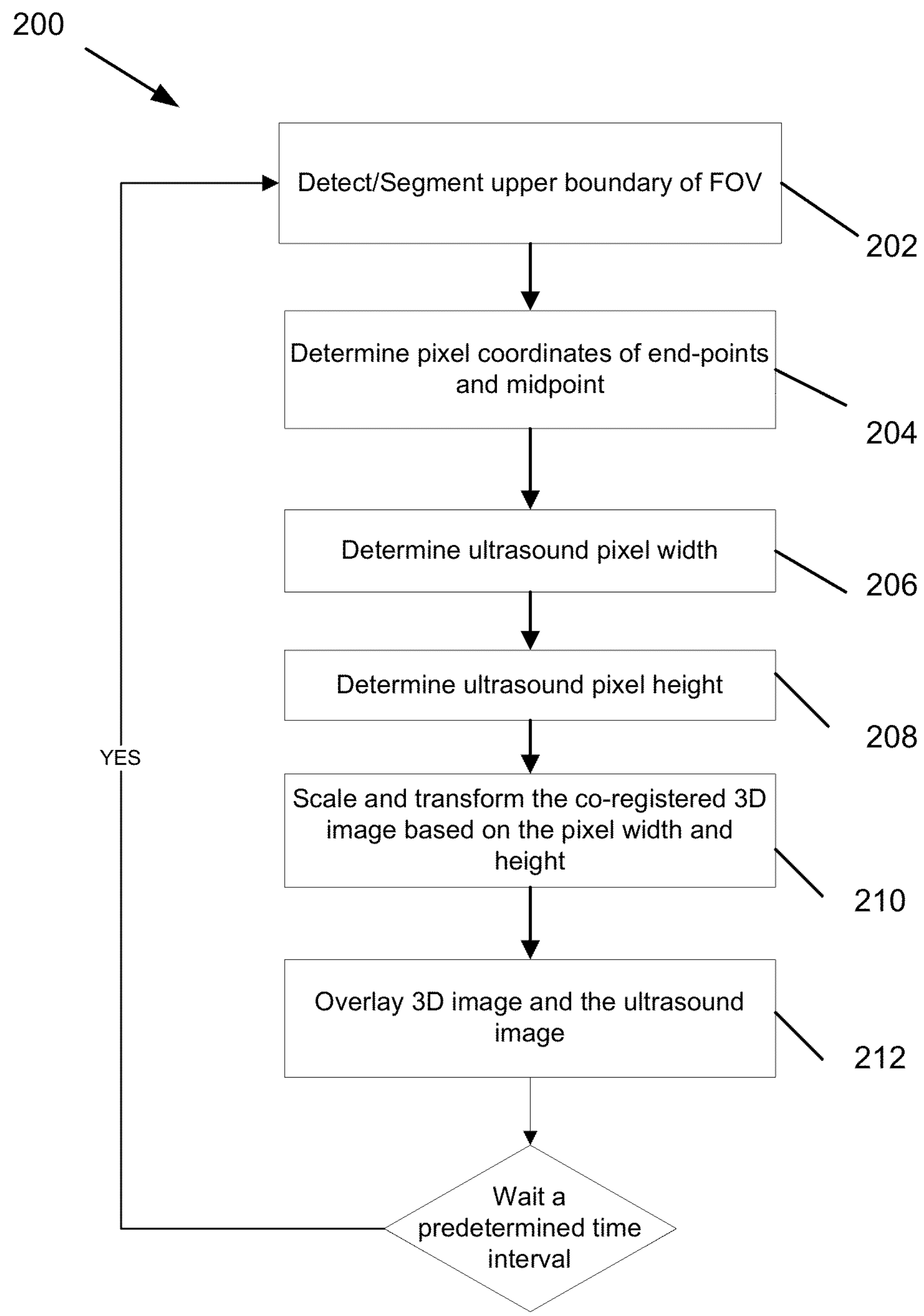
FIG. 2 is a flow diagram of a method of overlaying 3D images and the ultrasound images for a linear transducer, according to some embodiments.

With reference to FIG. 2, a method 200 for co-registering and overlaying the ultrasound image with the 3D image where the ultrasound transducer includes a linear transducer is illustrated. The method 200 can be performed on the navigation system 102, in real-time, as the ultrasound images (or video feed) are received from the ultrasound system. Alternatively, the method 200 can be performed at a later time, on images received and stored on the navigation system 102. The method 200 includes detecting and segmenting an upper boundary of a FOV of the linear transducer, determining end-point and midpoints of the line segment, determining pixel height and width of a pixel of the ultrasound, scaling the co-registered 3D image and overlaying the 3D image on the ultrasound image. As described above, in one example, the FOV dimensions of the ultrasound transducers for a plurality of brands or models of various ultrasound transducers may be stored and retrieved form a database. Alternatively, the FOV dimensions of the ultrasound transducers can be obtained from the clinical site during a calibration procedure further described below.

Figure 3:
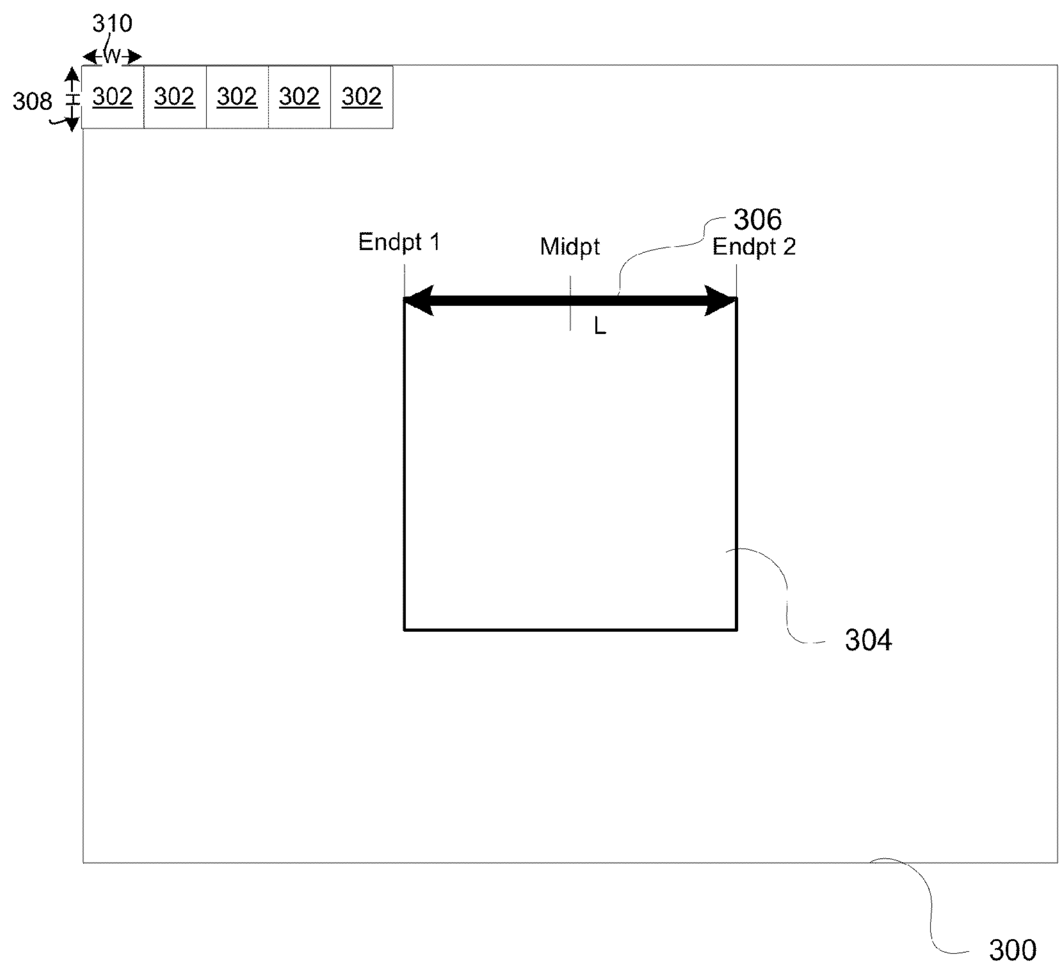
FIG. 3 is a schematic diagram of a FOV of a linear transducer, according to some embodiments.

In step 202, the navigation system 102 detects and segments the upper boundary of the rectangular FOV in a single frame of the real-time ultrasound image stream. FIG. 3 shows one example of a detected single frame 300 of an ultrasound image. The detected frame 300 includes pixels 302 having a height (H) 308 and width (W) 310, the FOV of the linear ultrasound transducer 304, and a line segment 306.

In step 204, the end points (labeled as endpt 1 and endpt 2 in FIG. 3) and the midpoint (labeled as midpt in FIG. 3) of the line segment 306 matching the upper FOV border are determined in pixel co-ordinates (i, j). The pixel co-ordinates (i, j) represent the pixel indices within the image frame. For example, the pixel in the upper left corner of the image frame is associated with a first index value (1,1). In other examples, the pixel co-coordinates can take on continuous values. Pixel coordinates having continuous values may be used with a curvilinear transducer, as further discussed below.

In some embodiments, the detection of the line segment 306 may be assisted by having the user select a point in the image just above the upper FOV boundary. For example, the user can select the point using a pointing device (e.g. a mouse). Using the selected point, the navigation system 102 can perform a downward directed search to identify the first horizontal line segment in the image.

In step 206, the navigation system 102 determines the pixel width (W) of the pixels in the single image frame 300. In one example, the pixel width is determined as a known width of the linear ultrasound transducer in mm (Wt) divided by the length of the corresponding line segment in pixels (L): W=Wt/L. The length of corresponding line segment (L) may be determined by determining a difference between endpt 1 and endpt 2.

In step 208, the navigation system 102 determines the ultrasound pixel height (H). In one example, the height is determined as the width (W) divided by the aspect ratio (AR) of the image frame: H=W/AR. AR represents a proportional relationship between the width and the height of the pixels within the ultrasound image. Typically, the AR for a given input video format is known and fixed. In the embodiments described herein, it can be advantageous if the pixels in the two-dimensional image stream have a fixed AR that is equal to the pixel width divided by the pixel height. While the actual pixel size in millimeters (mm) may change if the ultrasound image is zoomed in or out, the AR remains the same.

In step 210, the navigation system 102 uses the ultrasound pixel size (W×H) to scale the co-registered 3D image so as to have the same visual scale as the ultrasound image. In one example, the 3D image is selected that matches the current tracked orientation of the ultrasound FOV, which can be detected using the tracking system 108. The scaling is completed, for example, by matching the pixel dimension of the 3D image to the pixel dimensions of the ultrasound image. The scaling of the 3D image may allow the overlay of the 3D image and the ultrasound image without any inappropriate distortion or "stretch" of the MR image.

In step 212, the navigation system 102 overlays the co-registered 3D image and the ultrasound image stream by translating and rotating the 3D image. In one example, after the 3D image is scaled, the 3D image can be translated so that the known location of the center of the transducer face in the 3D image coincides with the mid point of the segmented upper FOV boundary in the ultrasound image. Once the 3D image is translated, the 3D image may be rotated so that the known direction vector of the transducer axis, within the 3D image, points vertically downward in the ultrasound image, and the known direction of the "lateral" transducer axis points horizontally (in the appropriate direction, either Left or Right) in the ultrasound image.

In some embodiments, the navigation system 102 can repeat the method 200, every pre-determined time interval, to detect changes in zoom. A change in the zoom level may change the length of the upper FOV boundary and the pixel size in millimeters (mm). By continuously performing the method 200 every pre-determined time interval, the 3D image can be overlaid accurately even if the zoom level is changed. The pre-determined time interval can be selected by the user of the navigation system. For example, selecting a shorter time interval can provide for faster response time to changes in the zoom level, but may also necessitate more processing power.

Overlaying Using a Curvilinear Ultrasound Transducer

Figure 4:
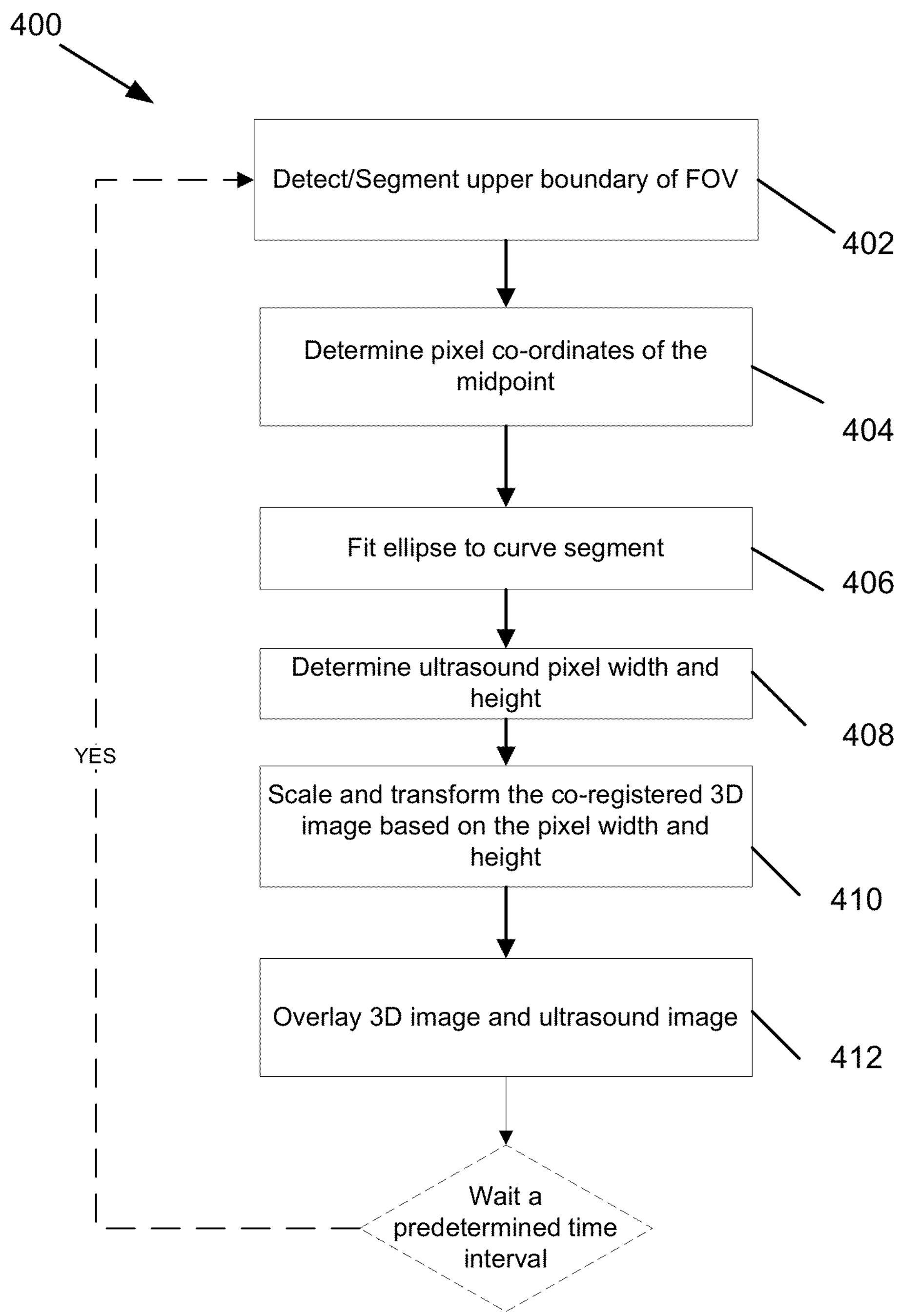
FIG. 4 is a flow diagram of a method of overlaying 3D images and the ultrasound images for a curvilinear transducer, according to some embodiments.

With reference to FIG. 4, one example of a method 400 for co-registering and overlaying the ultrasound image and the 3D image, where the ultrasound transducer has a curvilinear transducer, is illustrated. The method includes detecting and segmenting an upper boundary of a FOV of the curvilinear transducer, determining pixel co-coordinates of the midpoint of the upper FOV boundary, determining ultrasound pixel size, scaling the co-registered 3D image and overlaying the 3D image and the ultrasound image.

Figure 5:
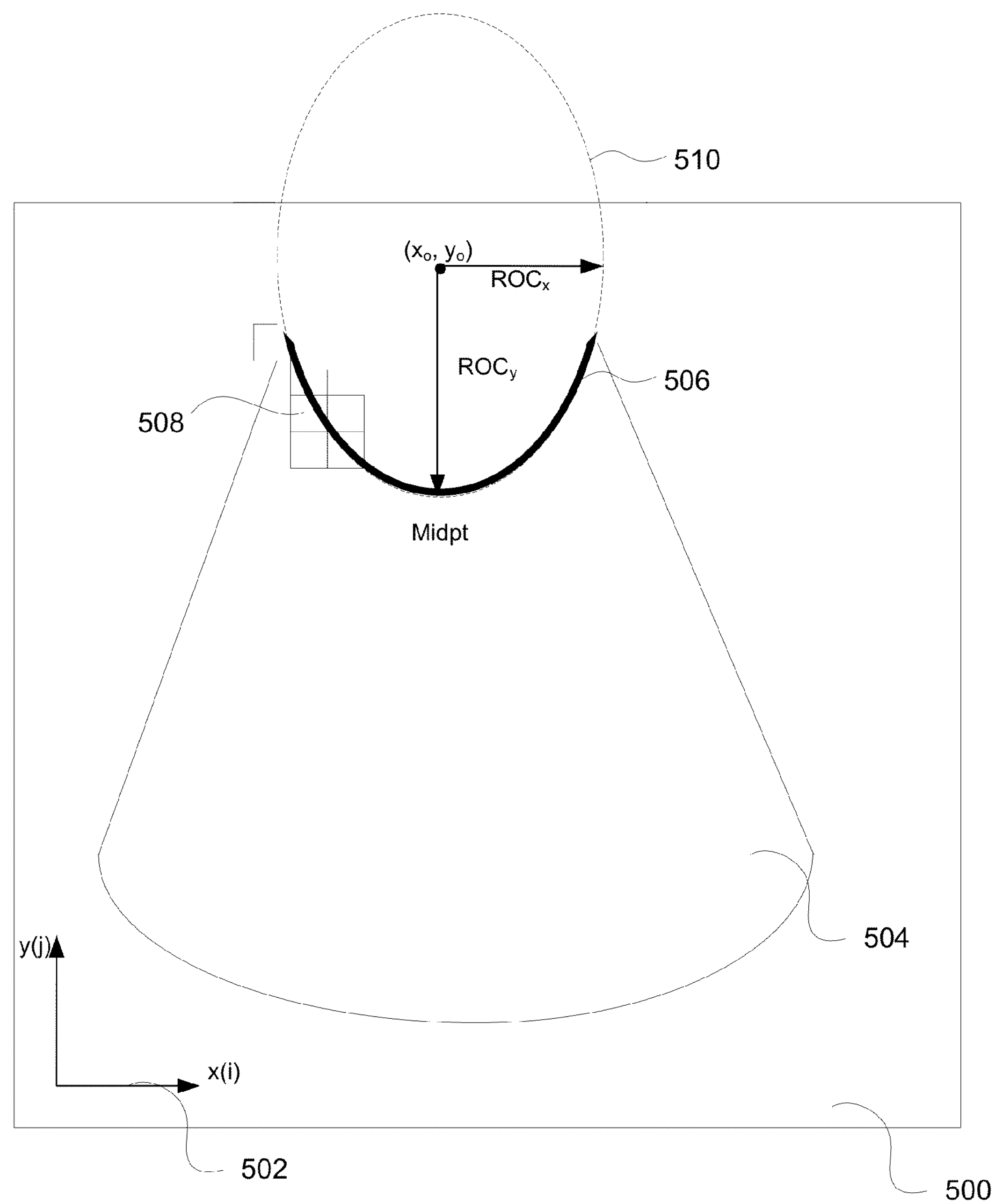
FIG. 5 is a schematic diagram of a FOV of a curvilinear transducer, according to some embodiments.

In step 402, the navigation system 102 detects and segments the upper boundary of the sector shaped FOV in a single frame of the real-time two-dimensional image stream. FIG. 5 shows one example of a detected image frame 500 of an ultrasound image using a curvilinear transducer. The detected frame 500 includes, pixel co-ordinates (i,j) 502, the FOV of the curvilinear ultrasound transducer 504, an arc segment 506 representing the upper curved boundary of the FOV having a midpoint, and an ellipse to fit the curve line segment 510. Similar to method 200, pixel co-ordinates are determined for the frame of the ultrasound image. In one example, a series of pixel co-ordinates 508 are determined that are estimated to lie along the upper curved boundary of the FOV. These pixel co-ordinates may take on continuous values as the curve may not pass through the exact center of each pixel containing the curve.

In step 404, the navigation system 102 determines the pixel co-ordinates of the midpoint 510 on this curve. In one example, the midpoint may be the lowest point on the curve arc segment 506.

In step 406, the ellipse 510 with radius of curvature (ROC) parameters, ROCx, and ROCy, is fit to the curve segment 506. By fitting the ellipse 510 to the curve segment 506, the ultrasound pixel size can be determined. The ellipse can be represented by expression:

$$(x-x_o)^2/\mathrm{ROC}x^2+(y-y_o)^2/\mathrm{ROC}y^2=1 \quad \text{Equation (1)}$$

where x is the horizontal axis within the ultrasound image pixel co-ordinate system, y is the vertical axis within the ultrasound image pixel co-ordinate system, and $x_o$ and $y_o$ represent the center point of the ellipse. In the example shown, ROCx and ROCy represent the "radius" of the ellipse along its semimajor and semiminor axes in ultrasound pixels (rather than mm).

According to various examples, where AR equals 1, ROCx equals ROCy, a circle, rather than an ellipse, is used to determine the pixel size. Where the AR of the ultrasound image is not equal to 1, an ellipse can used to determine pixel size. In this example, the circular arc becomes stretched along one dimension when considered in pixel co-ordinates.

The center point of the ellipse ($x_o$, $y_o$) can be determined in relation to the determined midpoint: with $x_o$ equal to the midpoint of the segmented curved upper boundary of the FOV; and $y_o$ equal to the y co-ordinate of the midpoint (for example, the lowest point) on the upper boundary of the curved FOV plus ROCy. Thus, in this example, Equation 1 contains only two degrees of freedom for fitting to the upper FOV boundary, ROCx and ROCy.

In step 408, the ultrasound pixel size can now be determined by determining width and height of the pixel in relation to the known radius of curvature of the curvilinear transducer. The width (W) and height (H) can be expressed as follows:

$$W=\mathrm{ROC}mm/\mathrm{ROC}x \quad \text{Equation (2)}$$

$$H=\mathrm{ROC}mm/\mathrm{ROC}y \quad \text{Equation (3)}$$

where ROCmm is the known ROC of the transducer in mm.

In embodiments where the AR may not by known in advance, the AR can be computed as AR=W/H. In embodiments where the AR is known in advance, the fitting of the ellipse can be constrained to a single degree of freedom, which may improve the accuracy of the fit of the ellipse to the upper boundary of the FOV. In this embodiment, the known AR can be used in combination with Equation 2 and Equation 3 to express ROCy in terms of ROCx and can be represented by dividing Equation (2) by Equation (2):

$$\mathrm{AR}=\mathrm{ROC}y/\mathrm{ROC}x \quad \text{Equation (4)}$$

It then follows that ROCy=AR×ROCx and substituting into Equation (1) results in an ellipse with a single degree of freedom, ROCx, expressed by:

$$(x-x_o)^2/\mathrm{ROC}x^2+(y-y_o)^2/\mathrm{ROC}y^2=1 \quad \text{Equation (5)}$$

In step 410, the ultrasound pixel size (W×H) can be used to scale the co-registered 3D image, so as to have the same visual scale as the ultrasound image. In one example, the 3D image is selected that matches the current tracked orientation of the ultrasound FOV, which can be detected using the tracking system 108. The scaling is completed, for example, by matching the pixel dimension of the 3D image to the pixel dimensions of the ultrasound image. The scaling of the 3D image may allow the overlay of the 3D image over the ultrasound image without any inappropriate distortion or "stretch" of the MR image.

In step 412, the navigation system 102 overlays the co-registered 3D image and the ultrasound image stream by translating and rotating the 3D image. In one example, after the 3D image is scaled, the 3D image can be translated so that the known location of the center of the transducer face in the 3D image coincides with the mid point (midpt) of the segmented upper FOV boundary in the ultrasound image. Once the 3D image is translated, the 3D image may be rotated so that the known direction vector of the transducer axis, within the 3D image, points vertically downward in the ultrasound image, and the known direction of the "lateral" transducer axis points horizontally (in the appropriate direction, either Left or Right) in the ultrasound image.

In some embodiments, the navigation system 102 can repeat the method 400, every pre-determined time interval, to detect changes in zoom. A change in zoom level may change the length of the upper FOV boundary and the pixel size in millimeters (mm). By continuously performing the method 400 every pre-determined time interval, the 3D image can be overlaid accurately even if zoom level is changed. The pre-determined time interval can be selected by the user of the navigation system. For example, selecting a shorter time interval can provide for faster response time to changes in zoom level, but may also necessitate more processing power.

Dynamic Depth Detection

According to various embodiments, for some ultrasound systems, to insure that the displayed ultrasound image occupies as much area on the ultrasound display as possible, the ultrasound image display automatically re-scales its pixel dimensions when a user manually adjust the image depth. This functionality may make it challenging to dynamically reformat a 3D image dataset to match a real-time two-dimensional ultrasound stream, as the ultrasound image size and pixel dimensions may change part-way through an imaging session, particularly if the operator adjusts the image depth of the ultrasound system.

For a subset of ultrasound systems, the default configuration is such that the number of pixels in the vertical dimension of the displayed ultrasound image is constant regardless of image depth. For this subset of ultrasound systems, the width in pixels of the displayed image dynamically changes when the operator adjusts the image depth. In these cases, methods described below can be used to automatically detect changes in image depth dynamically, even midway through an imaging session, and to rescale the image accordingly.

Figure 6:
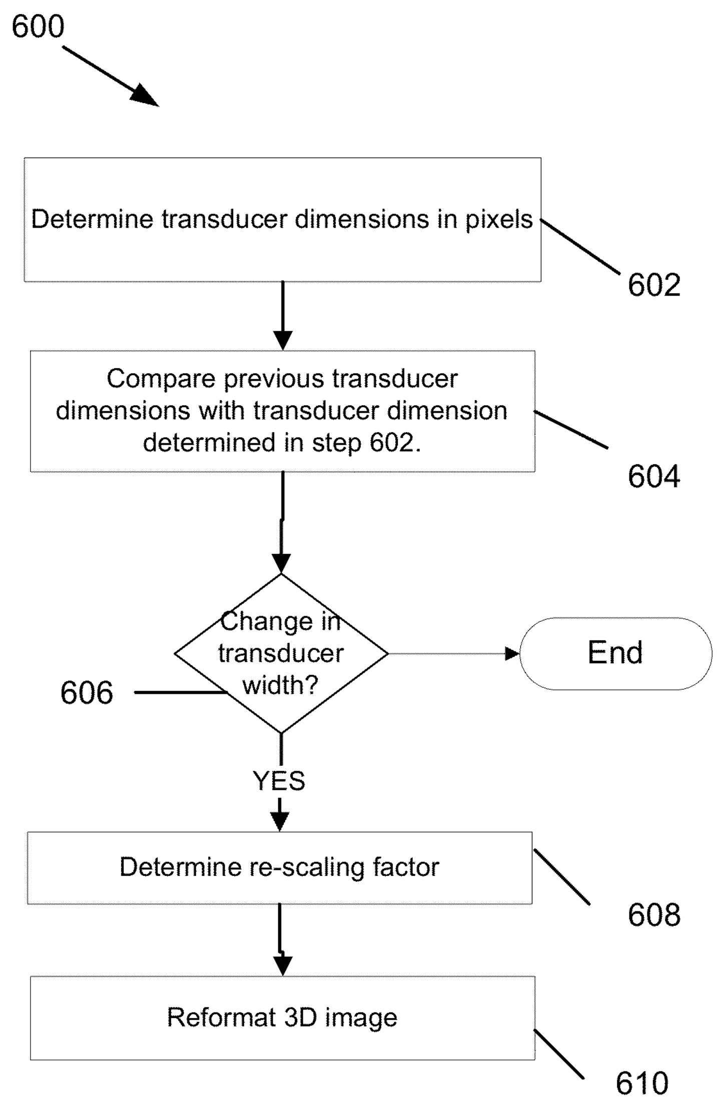
FIG. 6 is a flow diagram of a method for dynamically detecting changes in image depth, according to some embodiments.

With reference to FIG. 6, one example of a method 600 for dynamically detecting changes in image depth of an ultrasound image is illustrated. In step 602, once every N frames of the ultrasound video stream (where N≥1), the transducer dimensions are automatically determined using the methods described above. The transducer dimensions may include the width in pixels, for a linear transducer, or the radius of curvature (ROC) in pixels, for a curvilinear transducer.

In step 604, the navigation system 102 compares the dimensions determined in step 602 to the determined dimensions for a previous frame, calculated N frames previously. If the dimensions are unchanged (step 606), then the depth of the image has not changed. In this example, no rescaling of the reformatted 3D image display is needed and the method 600 ends.

In step 606, if the dimensions calculation result differs from the previous result (calculated N frames previously), then the operator has manually adjusted the depth of the ultrasound image. In this example, the reformatted 3D image display needs to be re-scaled accordingly and the method 600 proceeds to step 608.

In step 608, the navigation system 102 determines a scaling factor, which may allow the 3D image to be re-scaled to match the adjusted depth of the ultrasound image. The scaling factor for a linear transducer can be determined as follows:

$$K=\text{Width}_2/\text{Width}_1 \qquad \text{Equation (6)}$$

where Width1 is the new width calculation (in pixels) and Width2 is the previous width calculation (in pixels). For a curvilinear transducer, the rescaling factor can be determined as follows:

$$K=\text{ROC}_2/\text{ROC}_1 \qquad \text{Equation (7)}$$

where $\text{ROC}_1$, is the new ROC calculation (in pixels) and $\text{ROC}_2$ is the previous ROC calculation (in pixels). In cases where both ROCy and ROCx are defined, either one can be used for purposes of determining the scale factor K.

In step 610, the scaling factor K can be used to determine the new image depth, where $\text{depth}_{new}=\text{K}\times\text{depth}_{old}$. The reformatted 3D image display and associated annotations can then be updated to reflect the adjustment in the currently displayed ultrasound image depth.

Overlaying the Ultrasound Image Using Depth Detection

Figure 7:
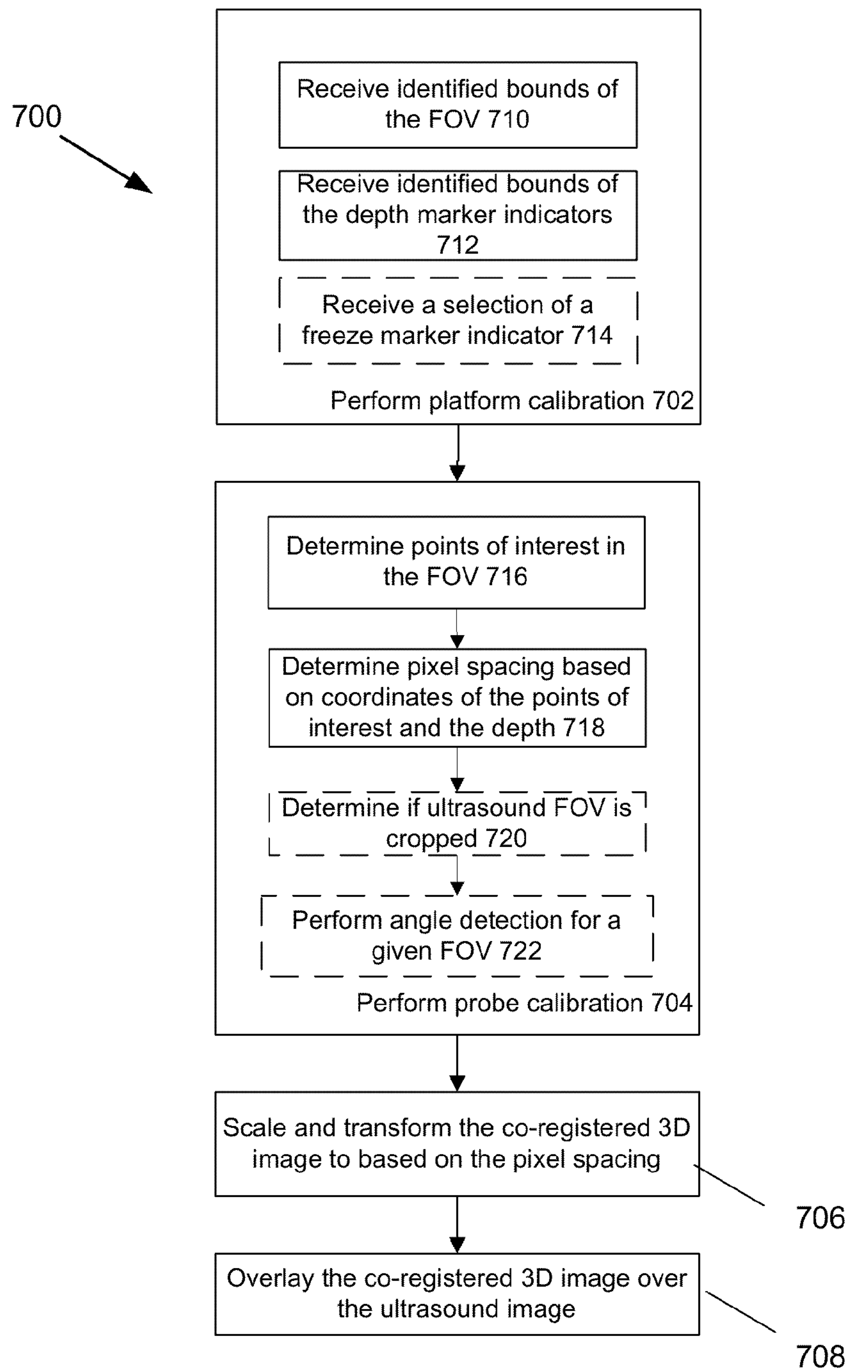
FIG. 7 is a flow diagram of an alternative method of overlaying an 3D image with an ultrasound image using symbol matching, according to some embodiments.

Another method 700 of ultrasound image overlaying the 3D image and the ultrasound image is described with reference to FIG. 7. The ultrasound overlay depth detection 700 uses symbol matching, where a depth marker is identified on the ultrasound image's annotations and linked to a given depth and settings. The key advantage of the method 700 over the previous method described above with reference to FIGS. 2-6 is that the ultrasound signal may not be analyzed. Because the depth detection is independent of the ultrasound signal, the method 700 allows the user to adjust any zoom or FOV settings on the ultrasound system.

As described in more detail below, the method 700 of depth detection includes a two-step calibration procedure. The first step in the calibration procedure includes an ultrasound system (or platform level) calibration that is performed once per ultrasound system. The second step includes a transducer specific calibration that is performed once per transducer on any given ultrasound system. Both calibration procedure steps are intended to be service level procedures. It is appreciated that the method 700 and the calculations performed part of the method can be used for both linear and curvilinear ultrasound transducers. The information received and determined as a result of both the platform level calibration and the transducer calibration, such as the bounds of the FOV, the depth markers in the image, and the pixel spacing may be received by the navigation system 102. The information received may be used to determine pixel spacing of the ultrasound image.

It is appreciated that any image processing methods or techniques may be used in performing the various calibration steps to detect and identify various image features. For example, whether or not a given pixel contains part of the ultrasound signal or contains a particular annotation can be determined by comparing the pixel to the background threshold (or pixel intensity threshold). In addition, methods or techniques of detecting text in individual image frames can be used to determine text characters in the ultrasound images.

In step 702, the ultrasound system (platform level) calibration is performed, which includes receiving identified the bounds of the FOV in the ultrasound image and defined depth markers within the ultrasound image. The steps of performing platform level calibrations 710-714 are described with reference to FIGS. 8A-8B.

In step 704, the transducer specific calibration is performed, which includes detection of the center, upper and lower coordinates of the FOV, determining ultrasound pixel spacing and for each possible depth for the ultrasound transducer, specifying the current depth in the calibration interface, and confirming that the depth marker and the ultrasound FOV are identified correctly. The steps of performing transducer level 716-722 calibrations are described with reference to FIGS. 9A-9B.

In step 706, the ultrasound pixel spacing can be used to scale the co-registered 3D image so as to have the same visual scale as the ultrasound image. In one example, the 3D image is selected that matches the current tracked orientation of the ultrasound FOV, which can be detected using the tracking system 108. The scaling is completed, for example, by matching the pixel dimension of the 3D image to the pixel dimensions of the ultrasound image. The scaling of the 3D image may allow the overlay of the 3D image and the ultrasound image without any inappropriate distortion or "stretch" of the 3D image.

In step 708, the co-registered 3D image and the ultrasound image stream can then be overlaid by translating and rotating the 3D image. In one example, after the 3D image is scaled, the 3D image can be translated so that the known location of the center of the transducer face in the 3D image coincides with the points of interest (A and B), and the detected center, upper and lower coordinates. Once the 3D image is translated, the 3D image may be rotated so that the known direction vector of the transducer axis, within the 3D image, points vertically downward in the ultrasound image, and the known direction of the "lateral" transducer axis points horizontally (in the appropriate direction, either Left or Right) in the ultrasound image. In some embodiments, the ultrasound image stream can be overlaid on the 3D image.

Ultrasound System Specific Calibration

Figure 8A:
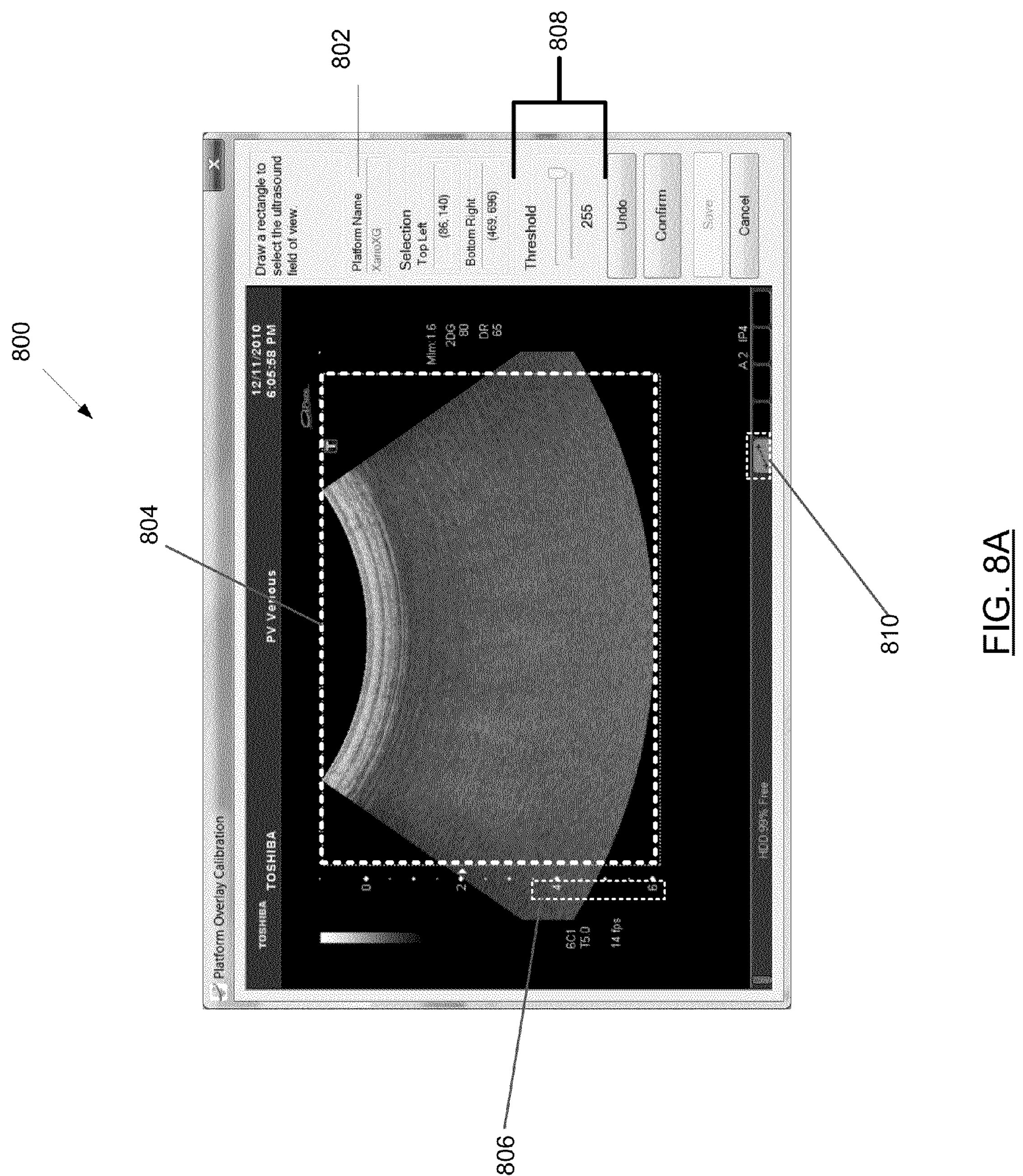
FIG. 8A is schematic diagram of one example of a platform level calibration interface for overlaying a 3D image and an ultrasound image, according to some embodiments.
Figure 8B:
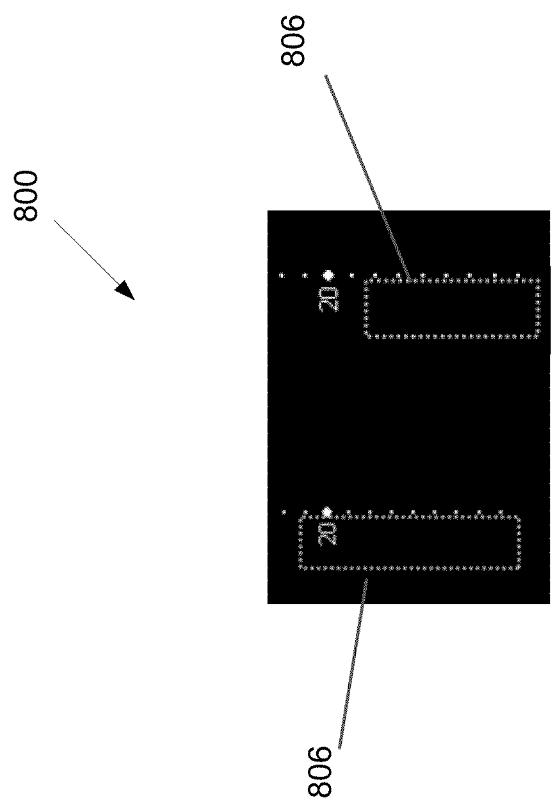
FIG. 8B is schematic diagram of one example of portion of a platform level calibration interface for overlaying a 3D image and an ultrasound image, according to some embodiments.

The steps of performing ultrasound system calibration (step 702) are described with reference to FIGS. 8A-8B, which shows one example of a calibration interface 800 on the navigation system. In one example, the calibration performed prior to real-time ultrasound signal detection and may only be performed once for a given ultrasound system. Referring to FIG. 8A, the user can assign the name of the ultrasound system to be calibrated 802. In some examples, the user can adjust other settings for a given ultrasound system. For example, the user can adjust analog settings of the video signal if necessary to adjust for background noise. Adjusting the analog settings may ensure that the correct AR of the video signal is maintained.

In step 710, for each ultrasound FOV, according to one example, the user draws a rectangle 804 to identify the bounds within which the FOV is fully contained. Selecting the FOV assists in limiting the image processing methods, described above with reference to method 700, to processes those locations of the ultrasound image that contain the relevant ultrasound signal. When selecting the FOV, the user may be instructed to ensure that a ruler annotation associated with the depth annotations is not included in the rectangle 804.

In step 712, once the ultrasound FOV is identified, the user draws a rectangle 806 to identify the bounds within which the depth marker indicators are fully contained. The identified depth marker can take the form of numerical annotations and may also include a ruler-associated depth marker (shown in FIG. 8A). In other examples, the identified depth markers may take the form of simple text (not shown), used in addition or instead of the numerical annotations. The user may be instructed to avoid selecting the ruler as part of the rectangle 806. Additionally, the depth marker may change position depending on the current depth. Identification of depth markers is described further below.

After the depth indicators are selected, the user can be instructed to cycle through all possible depths indicators to ensure that a numeric indicator for each depth is contained within the region. In a portion of the user interface shown in FIG. 8B, the user is shown the numeric indicator for the depth of 20 is not contained within the region 806 (shown on the right). The user can then be instructed to adjust the rectangle 806 to contain the depth indicator of "20" (shown on the left).

Referring again to FIG. 8A, the user can set a background threshold 808 for the depth marker. It is appreciated that in some examples, the ultrasound systems allow the ultrasound signal to pass through the depth marker region of interest (as shown in FIG. 8A). Setting the background threshold 808 assists in filtering the ultrasound signal in cases where the depth marker and ultrasound signal overlap. In these examples the user can select the background threshold 808 at which to ignore (or filter) any background signal, including the ultrasound signal, behind the depth markers.

It is appreciated that some ultrasound systems provide a visual indication when the ultrasound signal has been frozen (or paused). In these examples, in step 714, the user may identify an on-screen symbol 810 that indicates the ultrasound video has been frozen, by selecting a rectangle that contains this symbol. The selection of the symbol 810 in the frozen state is compared against the selection in the live video (or streaming) stage to determine whether the ultrasound signal has been frozen. In one example, the visual indication of the freeze marker may include a general matrix representation of the pixel data identified in the freeze marker region of interest, which is compared to the freeze marker region of interest from the live image. It is appreciated that the frozen selection is optional and may not be available on all ultrasound systems. In the examples where no region is defined, freeze state detection is not performed for that ultrasound system and the user may be instructed to skip the freeze state identification.

As noted above, different types of depth markers can be used by different ultrasound systems to indicate ultrasound signal depth. Stationary depth markers explicitly display the current depth, while ruler-associated depth markers show a numeric value that is equal to or less than the current depth and use tic marks to show incremental increases. For ruler-associated depth markers, while a tic mark may be reused for multiple depths, the location of this symbol can be different for each depth. For example, "10" depth marker can be used for a depth of 10 cm and 11 cm. By storing the pixel location and symbol for each depth, unique markers for any given depth of an ultrasound transducer can be identified.

To find the unique depth marker for each depth, the ultrasound system can search the identified depth marker region of interest systematically. For example, the ultrasound system can search the depth marker region from left to right, then bottom to top. Such systematic searching ensures finding the depth marker in the region of interest, which may be the most meaningful for accurately overlaying the FOV.

Once a pixel is found that is above the calibrated background threshold 808, the left, right, top and bottom bounds of the marker can be found. A matrix can then be created and populated as a binary representation of the pixel data. In one example, the matrix can include a value of "0" to indicate pixel intensity less than the threshold, while a value of "1" indicates pixel intensity greater than or equal to the threshold. It is possible that in cases where the depth marker overlaps the ultrasound signal, the user could greatly increase the gain of the ultrasound signal, causing the pixels to increase over the calibrated threshold 808. Therefore, the threshold should be set to the highest possible value, while still maintaining the ability to identify unique depth markers. In one example, the depth markers overlapping the ultrasound signal have had the associated annotations set to white, allowing for a threshold value of 255 and greatly reducing the possibility of errors due to overlapping ultrasound signal.

Transducer Specific Calibration

Figure 9A:
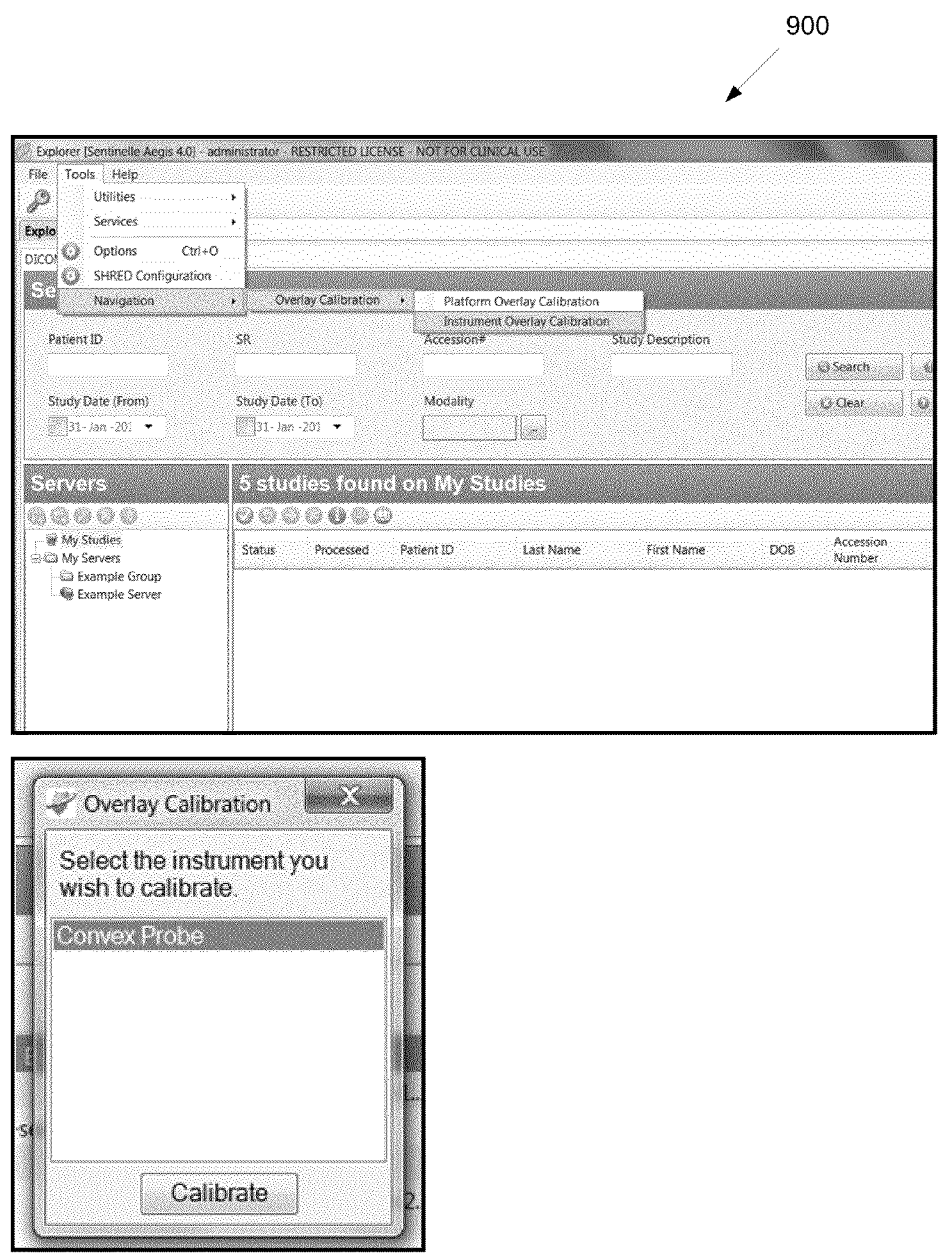
FIG. 9A is schematic diagram of one example of a transducer level calibration interface for overlaying a 3D image and an ultrasound image, according to some embodiments.
Figure 9B:
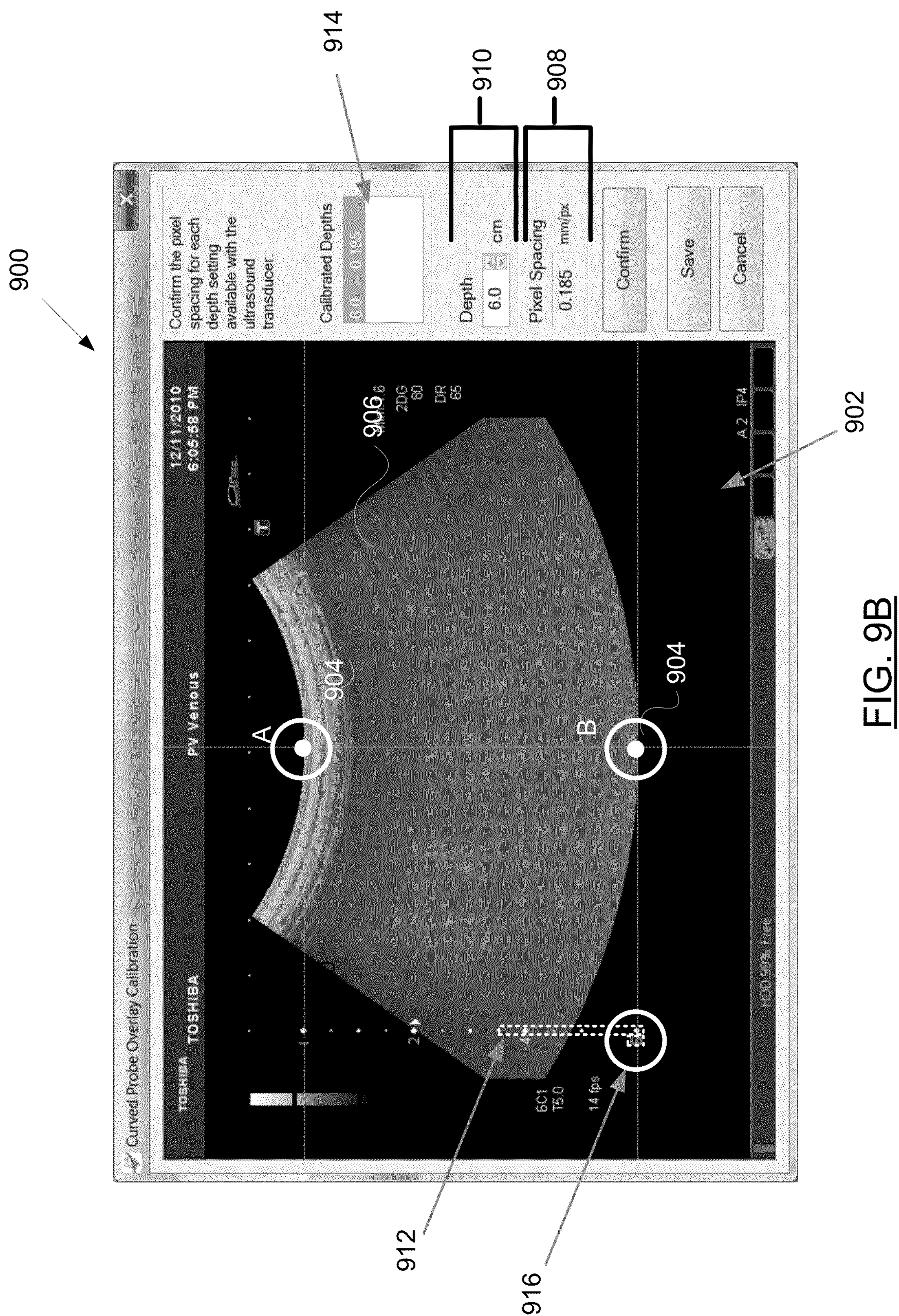
FIG. 9B is schematic diagram of one example of a transducer level calibration interface for overlaying a 3D image and an ultrasound image, according to some embodiments.

Once the particular ultrasound system is calibrated, the individual transducers can be calibrated for use with the ultrasound system (step 704) via the navigation system. The steps of performing transducer calibration are described with reference to FIGS. 9A-9B. Referring to FIG. 9A, within a user interface 900 presented to the user on the ultrasound system, the user can select the type of transducer for calibration. The transducer type can be chosen from a list of predefined transducers, specific to the ultrasound platform in use. The user interface may also provide a description of the transducers that include information such as radius of curvature (ROC) and the maximum FOV angle. In response to the transducer type selection, an ultrasound image is loaded into the system. The navigation system then detects points of interest 904 in the FOV 906, including the center, and the upper and lower coordinates, which are used to overlay the center, as well as the upper and lower bounds of the FOV in the ultrasound image 902 (step 716). The points of interest 904 are also used in determining the pixel spacing, and in determining the center of the transducer in the image as described further below. FIG. 9B shows one example of the ultrasound image 902 having points of interest 904 in the FOV 906 for a curvilinear transducer. The points of interest 904 include points A and point B having the coordinates of interest including the x-coordinate, which bisects the ultrasound signal, representing the y-coordinate of the upper boundary of the ultrasound FOV

906, and representing the y-coordinate of the lowest point in the image where ultrasound signal is displayed.

The coordinates of the points of interest are found for each depth in the transducer specific calibration as described below, which are expressed in pixels. Although FIG. 9B shows the FOV 906 for a curvilinear transducer, it is appreciated that the transducer calibration steps can be used for a linear transducer. Determining the x-coordinate of the center of the image eliminates the need to find the coordinate in the processing of each image. In addition, determining the x-coordinate ensures that the search for matching depth symbols starts at an appropriate location in the ultrasound image.

The center of the ultrasound FOV signal is first identified by searching down from the top of the ultrasound region of interest identified in the system level calibration described above. When the first non-zero pixel is reached, the edges of the ultrasound signal are then located by searching left and right. The middle point between the left and right edges is determined to be the center x-coordinate of the ultrasound signal. Given this center x-coordinate, the upper and lower bounds of the ultrasound signal are identified by searching along the center column for the first non-zero pixel. The upper boundary y-coordinate is defined as the first non-zero pixel when searching down from the top and the lower boundary is defined as the first non-zero pixel when searching up from the bottom.

Based on the x and y-coordinates, the center line and the upper and lower boundary lines representing the boundaries of the FOV can then be overlaid over the ultrasound image. In addition to the center and upper and lower bounds, the ultrasound image can be overlaid with the bounds of the identified depth markers determined in the ultrasound system level calibration described above.

The pixel spacing can be calculated as a function of the y-coordinate of the lower boundary and the upper boundary, as well as the current depth of the ultrasound image (step 718). The interface 900 can then display the pixel spacing 908. In one example, the current depth of the ultrasound image is entered by the user within the ultrasound system. The pixel spacing can be expressed as follows:

$$\text{pixelSpacing}=(\text{lowerBoundary}_y-\text{upperBoundary}_y)/\text{depth} \qquad \text{Equation (8)}$$

According to one example, the pixel spacing in the x- and y-directions is assumed to be equal, based on typical ultrasound systems. However, in other examples, the pixel spacing in the x and y directions can be different. As noted above, Equation 8 can be used for both linear and curvilinear ultrasound transducers.

To further calibrate the imaging transducer for correct depth markers, the user, via the interface 900, may be instructed to cycle through each possible depth for the ultrasound transducer and specify the current depth in the calibration interface 900. The calibrated depths may be displayed in the calibrated depth box 914. For each depth, the user can be instructed to confirm that the depth marker and the ultrasound FOV are identified correctly. If the depth is not identified correctly, the user can update the depth number box 910 to match the current depth of the ultrasound transducer.

In some embodiments, the navigation system may determine that the ultrasound signal is cropped at the bottom of the ultrasound image (step 720). In these embodiments, the cropped signal can lead to the calculation of an incorrect pixel distance and ultimately, incorrect pixel spacing. To compensate for cropped signal, the user can draw a rectangle 912 over a ruler displayed in the ultrasound image. The region identified as containing the ruler is searched in a similar manner to the depth marker detection in order to find the lowest ruler marker. The y-coordinate of the center of this marker can also be determined. If this coordinate is found to be outside the upper and lower bounds of the identified ultrasound region of interest, the coordinate identified as the lowest point of the ultrasound signal is used. If the ruler marker is within the ultrasound region of interest, the base point in the image is determined as the lower of the ruler coordinate and the lowest ultrasound signal coordinate. When every depth setting has been calibrated, each calibrated depth is stored for the selected transducer calibration and the transducer calibration process is completed.

Depth Detection While Tracking

The depth may be dynamically detected and updated while the navigation system 102 is in use with the tracking system 108. The depth marker region of interest 806 can be searched to find the lowest depth marker 916. The lowest depth marker 916 can be compared with the calibrated depth markers associated with the transducer in use, which are previously stored in the navigation system 102. If a match is found, the transducer's FOV depth is updated to reflect the updated depth, the corresponding calibration settings are applied to the overlaid ultrasound image. The overlay mask, further described below, can also be updated to reflect the updated FOV settings. If no match to the depth marker is found, the calibration settings for the transducer's FOV are not changed.

Field of View Angle Detection

As described above, the calibration steps may be performed for a curvilinear or linear transducer. However, for a curvilinear transducer, the ultrasound system performs the additional steps of angle detection for the given ultrasound FOV. The detected FOV angles are used for overlay masking methods described below. To find the left and right FOV angles, a line from the origin to the lower curve of the ultrasound FOV is defined, starting at the maximum FOV angle defined for the transducer.

Figure 10:
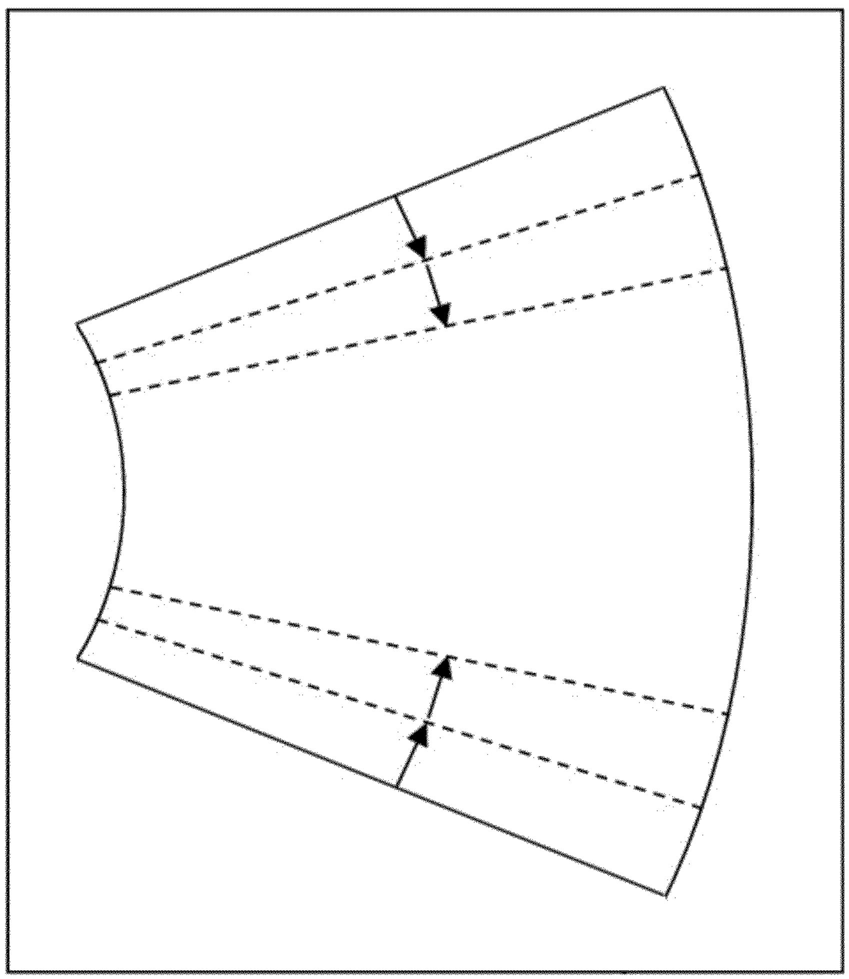
FIG. 10 is schematic diagram of one example of angle detection used in the transducer level calibration interface for overlaying a 3D image and an ultrasound image, according to some embodiments.

FIG. 10 shows outer lines 1002 which indicate the maximum FOV angle. These outer lines 1002 are scanned and if any non-zero pixels are found inside the calibrated ultrasound region of interest, the angle of the line may be set as the FOV angle. If there are no non-zero pixels on the line, the angle may be incremented by a predetermined amount, and the new line is scanned. For example, the predetermined incremented amount may be 0.25 degrees, and may be configured to balance the accuracy of the resulting angle with the computational cost of using smaller increments. However, other predetermined incremented amounts can be used. The FOV angles may be found by sweeping the line from left to right and vice versa. If there is a change in the FOV angles, the transducer's properties and the overlay mask are updated.

It is appreciated that in order for the ultrasound system to identify the correct FOV angle, the ultrasound system assumes a non-zero value set on the outermost edge of the ultrasound signal. However, in some examples, if the ultrasound signal gain is set to a low value, there may not be a non-zero value identified by the ultrasound system, resulting in detection of an incorrect angle. An annotation graphic may be included in the interface 900 that allows for the user to lock the current FOV angle, which may be useful in examples where the signal gain is set to a low value.

Masking the Ultrasound Overlay Image

In the embodiments described above, when applying the ultrasound image as an overlay over 3D images, further image processing may be used to remove any unwanted information from the ultrasound image or apply visual effects to the ultrasound image. For example, to remove any information other than the ultrasound signal, the ultrasound system can mask the ultrasound overlay image. Masking can be applied by first creating a binary image of the ultrasound image with the same number of pixels along the x and y axes and assigning a "1" to any pixel to be displayed and a "0" to any pixel to be removed. The binary image is determined by finding a collection of points in the image that can describe the position and shape of the ultrasound FOV. Using the collection of points, the ultrasound system can determine which pixels are within the FOV of the ultrasound image and which ones remain outside the FOV boundaries. The mask may be applied to the ultrasound image though a fragment shader.

Linear Ultrasound Transducers

Because of the geometries of the FOV for curvilinear and linear transducers, the masking process differs for each transducer. To determine the binary image for linear ultrasound transducers, the ultrasound system uses the y-coordinates of the upper and lower boundaries of the ultrasound FOV and the x-coordinates of the left and right boundaries of the FOV, as determined above in calibrating the transducer.

As described above, the lower boundary remains constant, while the upper boundary and left boundary are found in searching for non-zero pixels. The right boundary of the image can be determined as:

$$rightBoundary_x = center_x + (center_x - leftBoundary_x) \quad \text{Equation (9)}$$

Figure 11A:
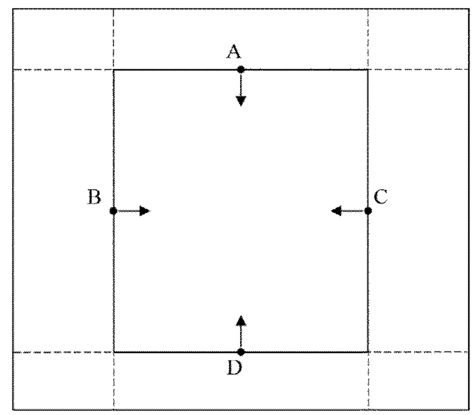
FIG. 11A is schematic diagram showing points of interest used in masking methods used for overlaying a 3D image and an ultrasound image for a linear transducer, according to some embodiments.

FIG. 11A shows the four boundaries of the FOV of a linear transducer. The four points on a linear transducer ultrasound image needed to describe the shape of the FOV are shown, with point A representing the Top Boundary, point B representing the Left Boundary, point C representing the Right Boundary, and point D representing the Bottom Boundary. The pixels within the four boundaries are set to "1," all other pixels are set to "0." As the result, any pixel that is outside these boundaries is masked out.

Curvilinear Ultrasound Transducers

To mask a curvilinear image, six points in the ultrasound image are needed to be identified, including the base of the upper curve of the FOV, the base of the lower curve of the FOV, the top points of the left and right field lines (which also correspond to points on the upper curve) and the bottom points of the left and right field line (which correspond to points on the lower curve).

Figure 11B:
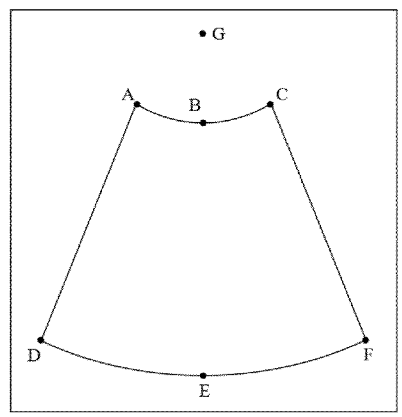
FIG. 11B is schematic diagram showing points of interest used in masking methods used for overlaying a 3D image and an ultrasound image for a curvilinear transducer, according to some embodiments.

FIG. 11B shows the six points including A=Top of Left Field Line, B=Base Point of Upper Curve, C=Top of Right Field Line, D=Bottom of Left Field Line, E=Base Point of Lower Curve, F=Bottom of Right Field Line, G=Origin of the FOV Lines, Center of Upper Curve.

Through the transducer specific calibration, described above, the upper curve base point and the current depth and the pixel spacing have been determined. The y-coordinate of the base of the lower curve, can be determined by:

$$lowerCurve_y = upperCurve_y + (depth \times pixelSpacing) \quad \text{Equation (10)}$$

In addition, using the FOV angle of the ultrasound signal, as described with reference to FIG. 10, the slope of the left and right field lines (from points A to D and C to F) can be calculated. To find the top of the left and right FOV lines (ABC), the length of these lines is set to the radius of curvature of the upper FOV curve and the origin of these lines to the center point of the upper FOV curve. To find the bottom points of these lines (DEF), the length of these lines is increased by the current depth, and multiplied by the pixel spacing. Using the bottom field line points (DEF) and the base point of the lower curve (ABC), the circle that fits the lower curve of the FOV can be determined.

Figure 11C:
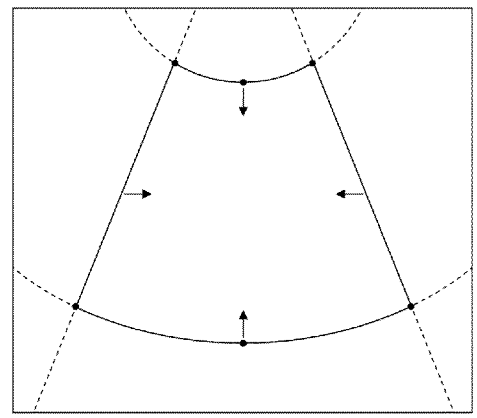
FIG. 11C is schematic diagram showing points of interest and circles used in masking methods used for overlaying a 3D image and an ultrasound image for a curvilinear transducer, according to some embodiments.

FIG. 11C shows the two lines (AD and CF) and two circles (with arcs DEF and ABC) that describe the shape of the FOV in the ultrasound image. The two lines and circles can be used calculate the position of any pixel in the image with respect to these lines and circles (i.e. to the left or right of a line, inside or outside of a circle). As shown in FIG. 11C, any pixel that is to the right of the left field line, to the left of the right field line, outside the circle defined by the upper curve and inside the circle defined by the lower curve is set to 1; all other pixels are set to 0.

Ultrasound Overlay Visual Effects

According to various embodiments, visual effect can be applied to the ultrasound image to be overlaid over the 3D image. Some examples of visual effects can include colorization and alpha blending. These visual effects may be applied using fragment shaders. To apply the colorization and alpha blending effects, the ultrasound system may determine the intensity of a pixel, and map the intensity to the colors red, green and blue. The mapping to each color can be weighed to determine how much of the intensity is to be applied to each color. In one example, the intensity is mapped to the color blue and the intensity is scaled so as to appear clearly overlaid over the 3D image.

Example Computer System

The embodiments of the systems and methods described herein may be implemented as hardware or software, or a combination of both executing in one or more computer systems. There are many examples of computer systems that are currently in use. In an embodiment these systems and methods are implemented in computer programs executing on programmable computers each comprising at least one processor, a data storage system (including volatile and non-volatile memory and/or storage elements), at least one input device, and at least one output device. For example and without limitation, the programmable computers may be a mainframe computer, server, personal computer, laptop, personal data assistant, or cellular telephone.

Further, aspects may be located on a single computer system (a workstation) or may be distributed among a plurality of computer systems connected to one or more communications networks. For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

A distributed computer system, in which various aspects and functions may be practiced, may include one more computer systems that exchange (i.e. send or receive) information. The computer systems may be interconnected by, and may exchange data through, a communication network. The network may include any communication network through which computer systems may exchange data. To exchange data using the network, the computer systems and the network may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems may transmit data via the network using a variety of security measures including, for example, TLS, SSL or VPN. The distributed computer system described herein is not so limited and may include any number of computer systems and computing devices, networked using any medium and communication protocol.

A distributed computer system, in which various aspects and functions may be practiced, may include a processor, a memory, a bus, an interface and data storage. The processor may perform a series of instructions that result in manipulated data. The processor may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor is connected to other system components, including one or more memory devices, by the bus.

The memory may be used for storing programs and data during operation of the computer system. Thus, the memory may be a relatively high performance, volatile, random access memory such as a dynamic random access memory (DRAM) or static memory (SRAM). However, the memory may include any device for storing data, such as a disk drive or other non-volatile storage device. Various examples may organize the memory into particularized and, in some cases, unique structures to perform the functions disclosed herein and these data structures may be tailored to store values for particular types of data.

Components of the computer system may be coupled by an interconnection element such as the bus. The bus may include one or more physical busses, for example, busses between components that are integrated within a same machine, but may include any communication coupling between system elements including specialized or standard computing bus technologies such as IDE, SCSI, PCI and InfiniBand. Thus, the bus enables communications, such as data and instructions, to be exchanged between system components of the computer system.

The computer system also includes one or more interface devices such as input devices or modules, output devices or modules and combination input/output devices or modules. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system to exchange information and communicate with external entities, such as users and other computer systems.

The data storage may include a computer readable and writeable nonvolatile (non-transitory) data storage medium in which instructions are stored that define a program or other object that may be executed by the processor. The data storage also may include information that is recorded, on or in, the medium, and this information may be processed by the processor during execution of the program. More specifically, the information may be stored in one or more data structures specifically configured to conserve storage space or increase data exchange performance. The instructions may be persistently stored as encoded signals, and the instructions may cause the processor to perform any of the functions described herein. The medium may, for example, be optical disk, magnetic disk or flash memory, among others. In operation, the processor or some other controller may cause data to be read from the nonvolatile recording medium into another memory, such as the memory, that allows for faster access to the information by the processor than does the storage medium included in the data storage. The memory may be located in the data storage or in the memory, however, the processor may manipulate the data within the memory, and then copy the data to the storage medium associated with the data storage after processing is completed. A variety of components may manage data movement between the storage medium and other memory elements and examples are not limited to particular data management components. Further, examples are not limited to a particular memory system or data storage system.

The various aspects and functions are not limited to being implemented on the computer system described above. Various aspects and functions may be practiced on one or more computers having a different architectures or components than described above. For instance, the computer system may include specially programmed, special-purpose hardware, such as an application-specific integrated circuit (ASIC) tailored to perform a particular operation disclosed herein.

The computer system may be a computer system including an operating system that manages at least a portion of the hardware elements included in the computer system. In some examples, a processor or controller, such as the processor, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., or a UNIX operating systems available from various sources. Many other operating systems may be used, and examples are not limited to any particular operating system.

The processor and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, functional components disclosed herein may include a wide variety of elements, e.g. executable code, data structures or objects, configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A method overlaying a three-dimensional image of a tissue and an image of the tissue from an imaging transducer, having a field of view, the method comprising:

co-registering a first co-ordinate space of the three-dimensional image with a second co-ordinate space of the field of view of the image from the imaging transducer;

determining pixel dimensions of the field of view in the second co-ordinate space;

scaling the three-dimensional image in the first co-ordinate space to match the pixel dimensions of the field of view in the second co-ordinate space, wherein the pixel dimensions comprise pixel width and pixel height; and transforming position and orientation of the three-dimensional image in the first co-ordinate space to match position and orientation of the field of view in the second co-ordinate space; and displaying an overlaid image comprising the three-dimensional image and the field of view of the imaging transducer, wherein scaling the three-dimensional image reduces distortion of the overlaid three-dimensional image.

2. The method of claim 1, wherein determining pixel dimensions of the field of view further comprises:

determining pixel coordinates of points of interest on an upper boundary of the field of view; and determining pixel width and height based on geometry of the upper boundary of the field of view.

3. The method of claim 2, wherein the imaging transducer comprises a linear transducer, the upper boundary comprises a line segment, and the points of interest comprise ends points and a midpoint of the line segment.

4. The method of claim 3, wherein determining the pixel width and height based on geometry further comprises determining the pixel width and height based on geometry of the line segment and aspect ratio of the image.

5. The method of claim 2, wherein the imaging transducer comprises a curvilinear transducer, the upper boundary comprises an arc segment, and the points of interest comprise a midpoint and a radius of curvature.

6. The method of claim 5, wherein determining the pixel width and height based on geometry further comprises determining the pixel width and height based on geometry of the arc segment and aspect ratio of the image.

7. The method of claim 1, further comprising detecting changes in image depth of the field of view of the image and rescaling the field of view based on a scaling factor to match an adjusted image depth of the field of view.

8. The method of claim 1, further comprising:

receiving the three-dimensional image of the tissue from a first imaging system; and receiving the image of the tissue from the imaging transducer from a second imaging system, wherein the first imaging system is different from the second imaging system.

9. An apparatus for overlaying a three-dimensional image of a tissue and an image of the tissue from an imaging transducer, having a field of view, the apparatus comprising:

a non-transitory computer readable medium configured to store any of the three-dimensional image and the image from the imaging transducer;

a processor, coupled to the computer readable medium and configured to:

co-register a first co-ordinate space of the three-dimensional image with a second co-ordinate space of the field of view of the image from the imaging probe;

determine pixel dimensions of the field of view in the second co-ordinate space;

scale the three-dimensional image in the first co-ordinate space to match the pixel dimensions of the field of view in the second co-ordinate space, wherein the pixel dimension comprise pixel width and pixel height; and transform position and orientation of the three-dimensional image in the first co-ordinate space to match the position and orientation of the field of view in the second co-ordinate space; and a display configured to display an overlaid image comprising the three-dimensional image and the field of view of the imaging transducer, wherein scaling the three-dimensional image reduces distortion of the overlaid three-dimensional image.

10. The apparatus of claim 9, wherein the processor is configured to:

determine pixel coordinates of points of interest on an upper boundary of the field of view; and determine pixel width and height based on geometry of the upper boundary of the field of view.

11. The apparatus of claim 10, wherein the imaging transducer comprises a linear transducer, the upper boundary comprises a line segment, and the points of interest comprise ends points and a midpoint of the line segment.

12. The apparatus of claim 10, wherein the imaging transducer comprises a curvilinear transducer, the upper boundary comprises an arc segment, and the points of interest comprise a midpoint and a radius of curvature.

13. The apparatus of claim 9, wherein the processor is further configured to detect changes in image depth of the field of view of the image and rescale the field of view based on a scaling factor to match an adjusted image depth of the field of view.

14. The apparatus of claim 9, further comprising an input module configured to receive the three-dimensional image of the tissue from a first imaging system and configured to receive the image of the tissue from the imaging transducer from a second imaging system, wherein the first imaging system is different from the second imaging system.

15. A method overlaying an image of a tissue from an imaging system, having an imaging transducer with a field of view, and a three-dimensional image of the tissue, the method comprising:

co-registering a first co-ordinate space of the three-dimensional image with a second co-ordinate space of the field of view of the image from the imaging transducer;

receiving input bounds of the field of view and depth markers identified in the image;

determining pixel spacing based on depth associated with the depth markers in the image; and scaling the three-dimensional image in the first co-ordinate space to match the pixel spacing of the field of view in the second co-ordinate space; wherein the pixel spacing comprises a distance between the respective centers of adjacent pixels;

transforming position and orientation of the three-dimensional image of the tissue in the first co-ordinate space to match the position and orientation of the field of view in the second co-ordinate space; and displaying an overlaid image comprising the field of view of the imaging transducer and the three-dimensional image.

16. The method of claim 15, further comprising receiving depth associated with each of the depth markers in the field of view.

17. The method of claim 15, further comprising receiving input identifying a freeze state of the image from the transducer.

18. The method of claim 15, further comprising determining co-ordinates of points of interest defining center, upper and lower bounds of the field of view and determining pixel spacing based on the co-ordinates of the point of interest.

19. The method of claim 15, further comprising determining whether the field of view of the image is cropped.

20. The method of claim 15, wherein the imaging transducer comprises a curvilinear transducer, and the method further comprises detecting an angle of the field of view of the curvilinear transducer.

21. The method of claim 15, further comprising determining a set of pixels configured to define the field of view and masking out another set of pixels outside the defined the set of pixels defining the field of view.

22. The method of claim 15, further comprising:

receiving the three-dimensional image of the tissue from a first imaging system; and receiving the image of the tissue from the imaging transducer from a second imaging system, wherein the first imaging system is different from the second imaging system.

23. An apparatus for overlaying an image of a tissue from an imaging system, having an imaging transducer with a field of view, and a three-dimensional image of the tissue, the apparatus comprising:

a non-transitory computer readable medium configured to store any of the three-dimensional image and the image from the imaging transducer;

a processor coupled to the computer readable medium and configured to:

co-register a first co-ordinate space of the three-dimensional image with a second co-ordinate space of the field of view of the image from the imaging transducer;

receive input identifying bounds of the field of view and depth markers in the image;

determine pixel spacing based on depth associated with the depth markers in the image; and scale the three-dimensional image in the first co-ordinate space to match the pixel spacing of the field of view in the second co-ordinate space; and wherein the pixel spacing comprises a distance between the respective centers of adjacent pixel; and transform position and orientation of the three-dimensional image in the first co-ordinate space to match the position and orientation of the field of view in the second co-ordinate space; and a display configured to display an overlaid image comprising the field of view of the imaging transducer and the three-dimensional image.

24. The apparatus of claim 23, further comprising an input module configured to receive the three-dimensional image of the tissue from a first imaging system and configured to receive the image of the tissue from the imaging transducer from a second imaging system, wherein the first imaging system is different from the second imaging system.

25. A method of calibrating an imaging system for overlaying an image of a tissue from the imaging system and a three-dimensional image of the tissue, the imaging system having an imaging transducer with a field of view, the method comprising:

providing for a user to select bounds of the field of view of the imaging transducer;

providing for the user to select depth marker indicators in the image;

cycling through the depth marker indicators to determine a specific depth marker for each depth; and calculating coordinates of points of interest in the field of view of the image; and calculating pixel spacing based on the coordinates of the points of interest and depth associated with the depth markers in the image.

26. The method of claim 25, further comprising providing for the user to select an area identifying a freeze state of the image from the transducer.

27. The method of claim 25, further comprising providing for the user to select a background threshold, wherein the background threshold is used to filter an ultrasound signal overlapping with the depth marker indicators.

28. The method of claim 25, further comprising determining whether the field of view of the image is cropped.

29. The method of claim 25, wherein the imaging transducer comprises a curvilinear transducer, and the method further comprises detecting an angle of the field of view of the curvilinear transducer.

* * * * *